US012751379B2

(12) United States Patent

Zhang et al.

(10) Patent No.: US 12,751,379 B2

(45) Date of Patent: Oct. 6, 2026

(54) DEVICE AND METHOD FOR SOIL MOISTURE STABILIZATION AND TREE OR PLANT PROTECTION

(71) Applicant: Zynnovation, LLC, Ashland, VA (US)

(72) Inventors: Wei Zhang, Midlothian, VA (US); Hailing Yang, Midlothian, VA (US)

(73) Assignee: ZYNNOVATION, LLC, Ashland, VA (US)

( * ) Notice: Subject to any disclaimer, the term of this patent is extended or adjusted under 35 U.S.C. 154(b) by 0 days.

(21) Appl. No.: 18/529,295

(22) Filed: Dec. 5, 2023

(65) Prior Publication Data

US 2025/0143232 A1 May 8, 2025

Related U.S. Application Data

(63) Continuation of application No. 16/317,709, filed as application No. PCT/US2017/042281 on Jul. 15, 2017, now abandoned.

(60) Provisional application No. 62/363,068, filed on Jul. 15, 2016.

(51) Int. Cl.

| | |
|---|---|
| ***A01G 13/32*** | (2025.01) |
| ***A01G 13/31*** | (2025.01) |
| ***A01G 24/35*** | (2018.01) |
| ***A01G 25/02*** | (2006.01) |
| ***A01G 25/16*** | (2006.01) |
| ***A01M 1/20*** | (2006.01) |

(52) U.S. Cl.

CPC ............ *A01G 13/32* (2025.01); *A01G 13/31* (2025.01); *A01G 24/35* (2018.02); *A01G 25/02* (2013.01); *A01G 25/167* (2013.01); *A01M 1/2005* (2013.01)

(58) Field of Classification Search

CPC ........ A01G 13/33; A01G 24/35; A01G 13/32; A01G 13/31; A01G 25/02; A01G 25/167; A01M 1/2005

See application file for complete search history.

(56) References Cited

U.S. PATENT DOCUMENTS

| | | | |
|---|---|---|---|
| 2,752,201 | A | 6/1956 | Ludwig |
| 3,069,314 | A | 12/1962 | Jenkins |
| 3,420,064 | A | 1/1969 | Blass et al. |
| 3,586,239 | A | 6/1971 | Blass |
| 3,604,728 | A | 9/1971 | Symcha et al. |
| 4,015,432 | A | 4/1977 | Ball |
| 4,179,499 | A | 12/1979 | Christensen |
| 4,318,248 | A | 3/1982 | Muldner |
| 4,508,472 | A | 4/1985 | Handy et al. |

(Continued)

FOREIGN PATENT DOCUMENTS

| | | |
|---|---|---|
| WO | 2017/132680 A1 | 8/2017 |
| WO | 2017/134171 A1 | 8/2017 |

*Primary Examiner* — Catherine A. Simone

(74) *Attorney, Agent, or Firm* — Baker Hostetler

(57) ABSTRACT

A mat for soil moisture stabilization can include a top layer, having a first perimeter edge; a water-permeable bottom layer, having a second perimeter edge affixed either directly to the first perimeter edge, or indirectly to the first perimeter edge via an intervening sidewall; and a water-absorbing and releasing center layer disposed between the top and bottom layers. The mat can include a section having superabsorbent particles and a section not having superabsorbent particles. Such a soil moisture stabilization mat can be used to protect plants and foundations in or on the ground, or stabilize soil moisture in an expansive or other soil.

11 Claims, 22 Drawing Sheets

(56) References Cited

U.S. PATENT DOCUMENTS

| | | | |
|---|---|---|---|
| 4,534,143 | A | 8/1985 | Goines et al. |
| 4,627,191 | A | 12/1986 | Bergere |
| 4,940,583 | A | 7/1990 | Thompson |
| 5,081,791 | A | 1/1992 | Baron et al. |
| 5,156,494 | A | 10/1992 | Owens et al. |
| 5,763,067 | A | 6/1998 | Brueggemann et al. |
| 5,924,251 | A | 7/1999 | Jalla |
| 6,082,932 | A | 7/2000 | Anderson |
| 6,132,138 | A | 10/2000 | Haese |
| 6,195,935 | B1 | 3/2001 | Bellucci et al. |
| 7,018,134 | B2 | 3/2006 | Sowry et al. |
| 9,629,313 | B1 | 4/2017 | Grossman |
| 2003/0140553 | A1 | 7/2003 | Moore |
| 2007/0144065 | A1 | 6/2007 | Lowe |
| 2007/0163172 | A1 | 7/2007 | Savich |
| 2008/0219768 | A1 | 9/2008 | Sanchez |
| 2009/0145025 | A1 | 6/2009 | Thrash |
| 2013/0031831 | A1 | 2/2013 | Orzeszyna et al. |
| 2013/0071186 | A1 | 3/2013 | Ekern |
| 2013/0074400 | A1 | 3/2013 | Roess et al. |
| 2014/0230322 | A1 | 8/2014 | Zhang et al. |
| 2014/0261192 | A1 | 9/2014 | Abeles |
| 2016/0374277 | A1 | 12/2016 | Lortscher et al. |
| 2017/0359967 | A1 | 12/2017 | Tetrault et al. |

Figure 3. Prior art plant protection mat.

Figure 4. WCMC mat prototypes.

Figure 5. Water distribution test.

Figure 6. Western red cedar seedlings water potential (lower chart) and survival rate (upper) in sandy soil

Figure 7. Soil moisture of the WCMC mats compared to watering bags in road median of highway.

Figure 8. Comparison of water amount and soil moisture among different treatments for in-container tests.

Figure 9. Comparison of water amount and soil moisture among different treatments for in-field tests.

Figure 11. Soil temperatures (3" below soil surface) in the road median of a highway in January-February.

Figure 12. Soil temperatures (3" below soil surface) in June and July.

Top and perspective views of one embodiment of a top layer of a WCMC plant protection mat, in combination of soaker hose with soaker hose placed on top of the mat.

Shows top and perspective views of one embodiment of a top layer of a WCMC plant protection mat, in combination with a soaker hose placed inside of the mat.

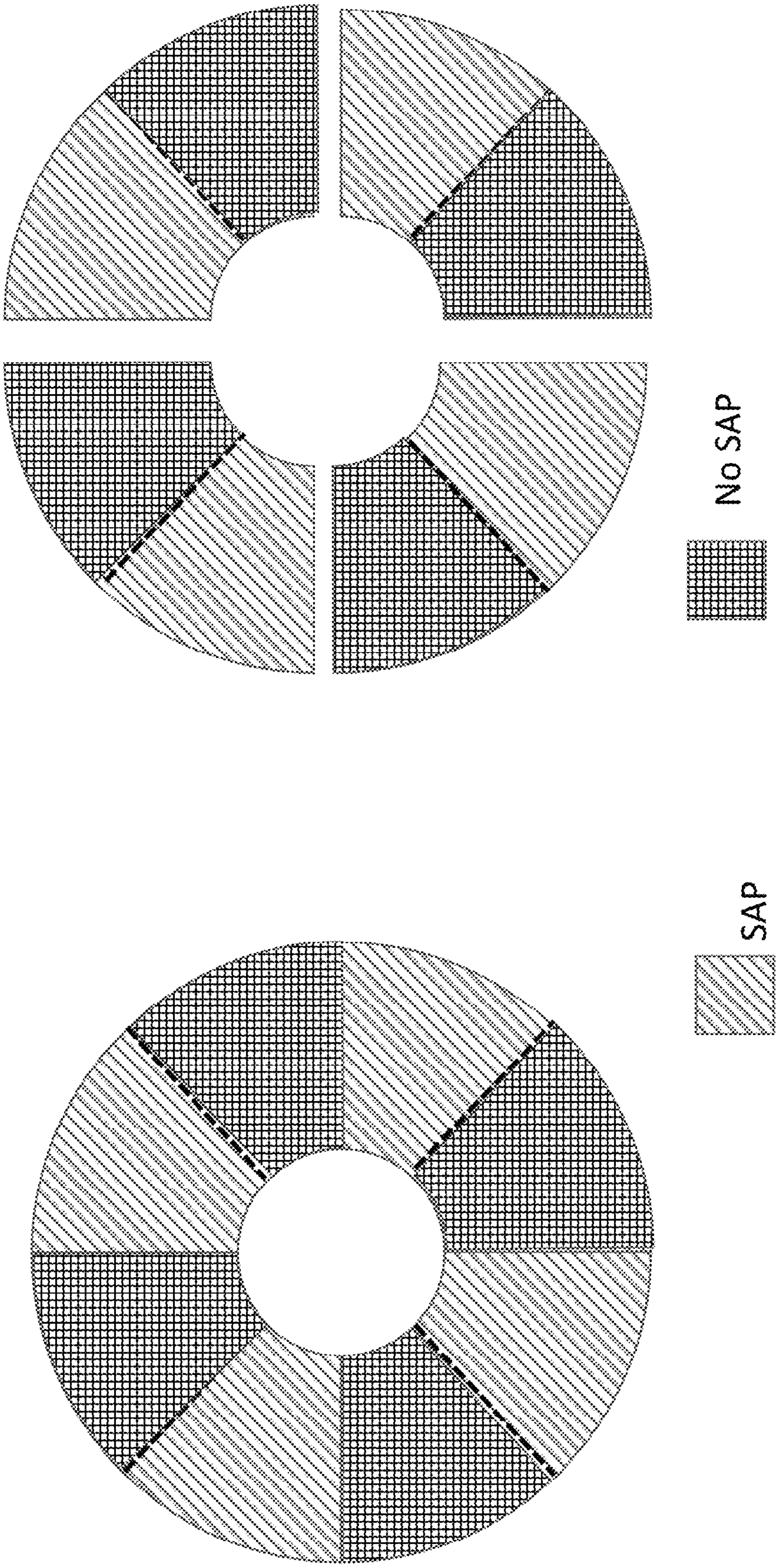
Figure 20. A plant protection mat with multiple segments

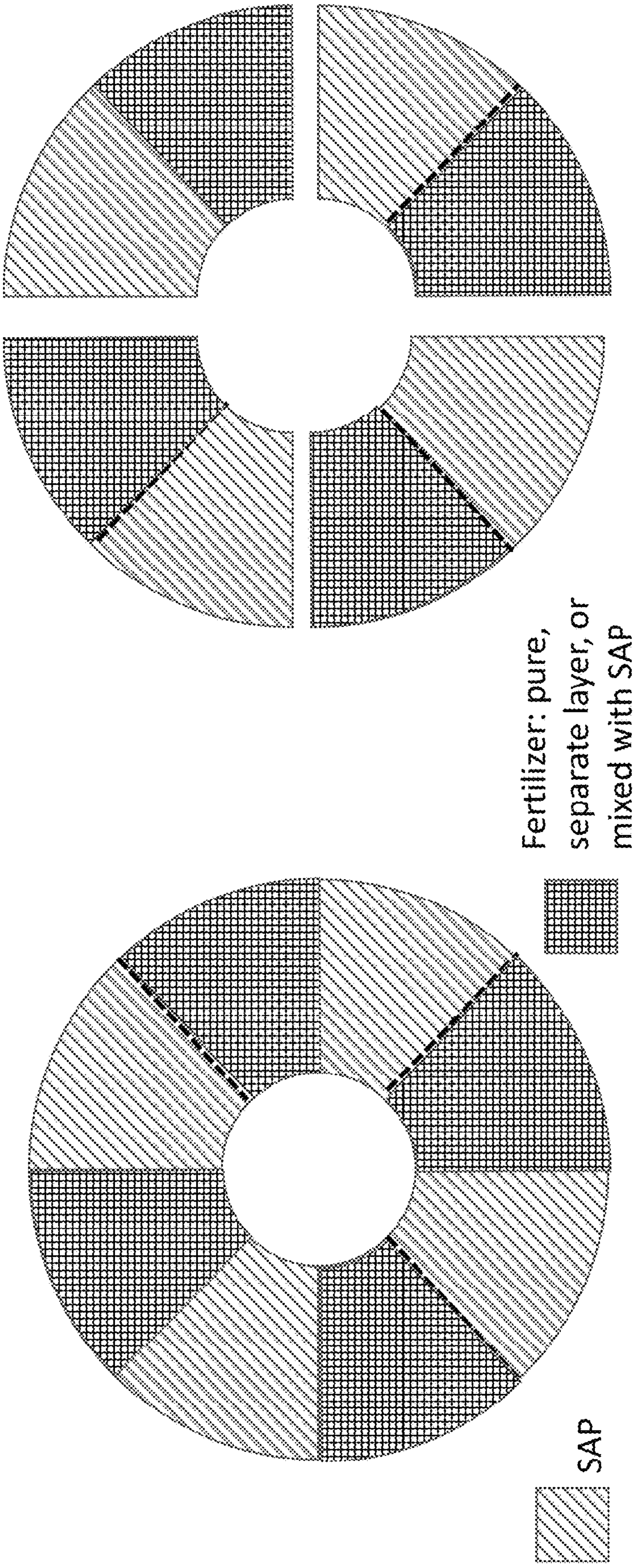
Figure 21. A plant protection mat with multiple segments.

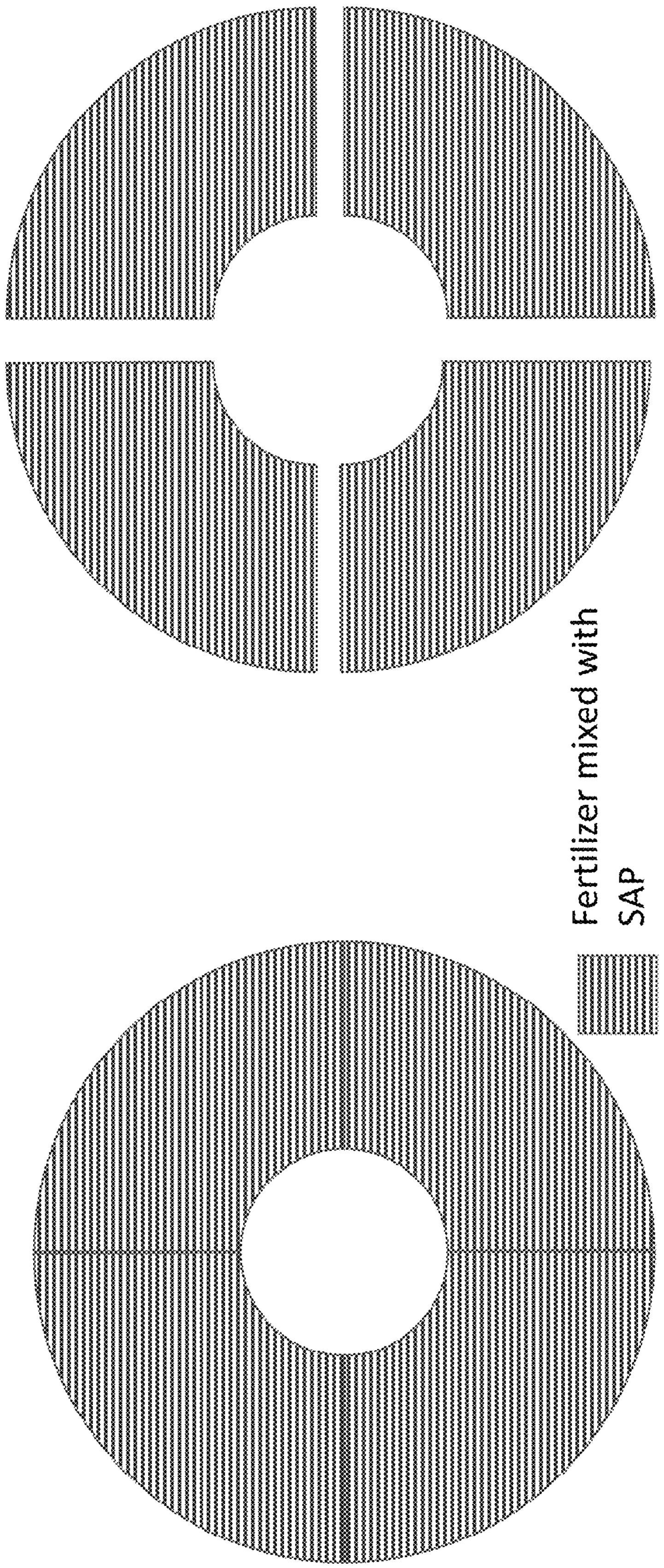
Figure 22. A plant protection mat with multiple segments

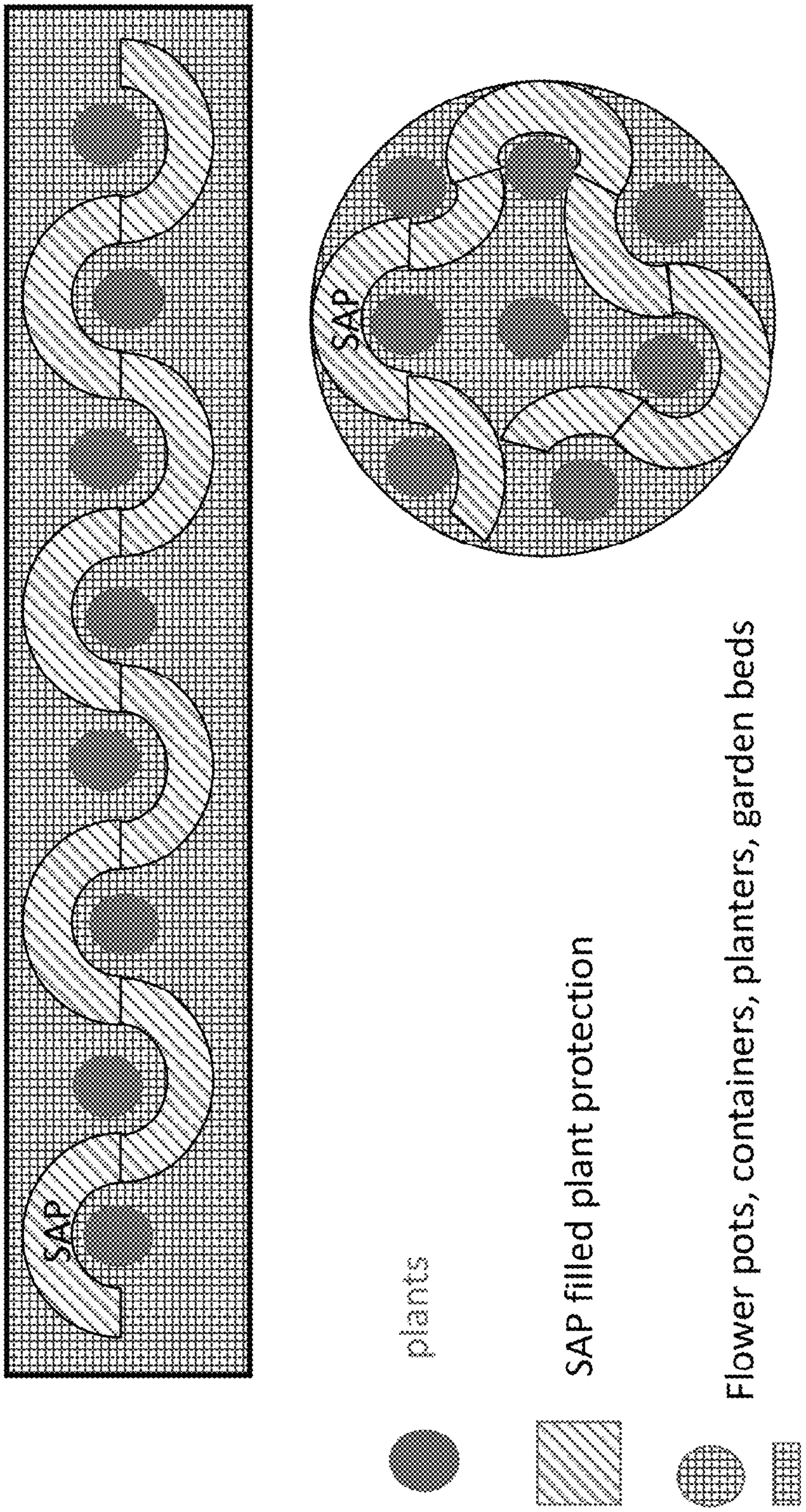
Figure 23. Plant protection mat with multiple segments or one long segment.

DEVICE AND METHOD FOR SOIL MOISTURE STABILIZATION AND TREE OR PLANT PROTECTION

RELATED APPLICATIONS

This application claims the benefit of priority to U.S. Application No. 62/363,068, filed Jul. 15, 2016.

FIELD OF THE INVENTION

The present invention relates to devices and methods useful in soil moisture stabilization and tree and plant protection.

BACKGROUND

Trees, shrubs and other woody plants planted in cities and communities provide social communal environmental and economic benefits. Planting a tree is easy; but growing a tree is not, especially in urban area where land/soil is limited and irrigation is not available. The average life of urban trees is 7 years. Among the factors that cause the short life of urban trees, poor irrigation on limited soil volume and weed control (including mowing) are on the top of the list.

Irrigation may be available in parks and around buildings, but usually not for off street and road median areas, where trees have the shortest life. Traditionally, these trees are watered with water trucks at a frequency of once every other day for newly planted trees. Recently, slow release watering bags are used for such situations. It is very costly to bring water to hard-to-reach areas and perform maintenance. These bags can be easily damaged by lawn care equipment such as lawn mowers and trimmers. Once they are broken, they are useless. Other critiques about the watering bags include: 1) watering bags dump water onto the root ball that forms an underground bathtub; 2) watering area is very close to the trunk area that does not stimulate outward root growth to chase water resources; 3) watering too much and too frequently slows down the integration of roots into the surrounding ground; and 4) empty bags left on the tree rubs the tree trunk in windy weather, promotes fungal growth and worsens insect problems. None of these watering bags suppress weed growth. Indeed, the presence of water from such bags encourages weed growth, which can consequently lead to more damage to the bags by lawn mower and trimmers.

Agricultural trees, plants and other crops are typically watered with an irrigation system or by natural rainfall only. Water usage can be a large operational cost item for drought-prone areas. Drip irrigation, intended to reduce evaporation loss of water during watering (compared to surface and sprinkler irrigation methods) is widely used by nurseries, orchards, vineyards, and farms. However, drip irrigation cannot prevent evaporation from ground and runoff water losses, which can be up to 50% of water usage. In some cases, as little as 13% to 26% of irrigation water is actually used by plants in some nursery operations.

Expansive soils, also known as shrink-swell soils, swelling soils, adobe, clay, or caliche soils, expand when they get wet, and then shrink as they dry out. Swelling or expansive soils are susceptible to volume change (shrink and swell) with seasonal fluctuations in moisture content. The magnitude of this volume change is dependent on the type of soil (shrink-swell potential) and its change in moisture content. A loss of moisture will cause the soil to shrink, while an increase in moisture will cause it to expand or swell.

Therefore, arid or semi-arid areas with seasonal changes of soil moisture experience a much higher frequency of swelling problems than areas that have higher rainfall and more constant soil moisture. As the soil expands and contracts it can create enough force to cause major damage to building foundations, patios, and sidewalks, as well as roads, railways, bridges, and other transportation structures. Pipelines are also subject to the damages of expansive soils.

Soils that alternately expand or contract due to wetting or drying conditions cause more damage to homes and buildings than floods, tornadoes and hurricanes combined. This is because about 50 percent of all American homes are built on problem soils. And about 50 percent of those homes suffer some damage—cracked foundations, damaged wallboard, or broken pipes, among other damages—from swelling and shrinking soils. It is estimated that the cost to homeowners to stabilize or shore up foundations is around $4 billion annually as of 2010.

Expansive soils are also responsible for the application of premature maintenance and rehabilitation activities on many miles of roadway each year. The volume change of clay type soils can result in longitudinal cracks near the pavement's edge and significant surface roughness (varying swells and depressions) along the pavement's length.

Current solutions to problems caused by expansive soils are based on three mechanisms: replace expansive soils with other materials, treat expansive soils so to reduce/eliminate the swell/shrink ratio, and stabilize moisture level in the soils underneath and around perimeter of the infrastructures. Commonly, structural slab that resists the shrink/swell of expansive soils, replacement high expansive soils with less expansive soils or gravel and sand, application of lime/cement and hydrophobic chemicals to reduce the expansive nature of the soils, installation of drainage system to limit rain water from entering ground, installation of irrigation system to maintain a certain level of moisture (especially during drought), and a combination of two or more of the above solutions are used. A few examples include U.S. Pat. Nos. 4,015,432, 4,508,472, 5,156,494, 5,924,251, and 6,132,138, as well as the US Published Application No. 20130071186.

Aside from the engineering solutions used to mitigate the expansive soil problem for an infrastructure, one recommended practice during extreme droughts is to irrigate the foundation and surrounding area. Such practice, however, would undesirably require a complicated irrigation system to apply water uniformly, in addition to requiring skill and guesswork in timing to maintain constant and uniform soil moisture. Overwatering caused by a malfunction of the irrigation system, leakage, and human error are as problematic as leaving it dry, because the swelling soil can cause damage as well. Further, and unfortunately, during a drought season, water resources are very limited while watering foundation and surrounding area are required to prevent foundation damage.

BRIEF DESCRIPTION OF THE DRAWINGS

FIG. 20 shows top views of one embodiment of a plant protection mat with multiple segments that may be used together or assembled into one unit where there is a hole in the middle for plants to be planted or around one or more already planted plants. Alternating sections with and without SAP are shown.

FIG. 21 shows top views of one embodiment of a plant protection mat with multiple segments that may be used together or assembled into one unit where there is a hole in the middle for plants to be planted or around one or more already planted plants. Alternating sections are shown.

FIG. 22 shows top views of one embodiment of a plant protection mat with multiple segments that assembles into one unit where there is a hole in the middle for plants to be planted or around one or more already planted plants.

FIG. 23 shows top views of other embodiments of plant protection mat having sections that may be placed together in serpentine fashion, or flexible long tube shaped WCMC mats in planters, flower pots and containers, garden beds, or ground to go around plants.

BRIEF DESCRIPTION OF THE SEVERAL EMBODIMENTS

Figure 1:
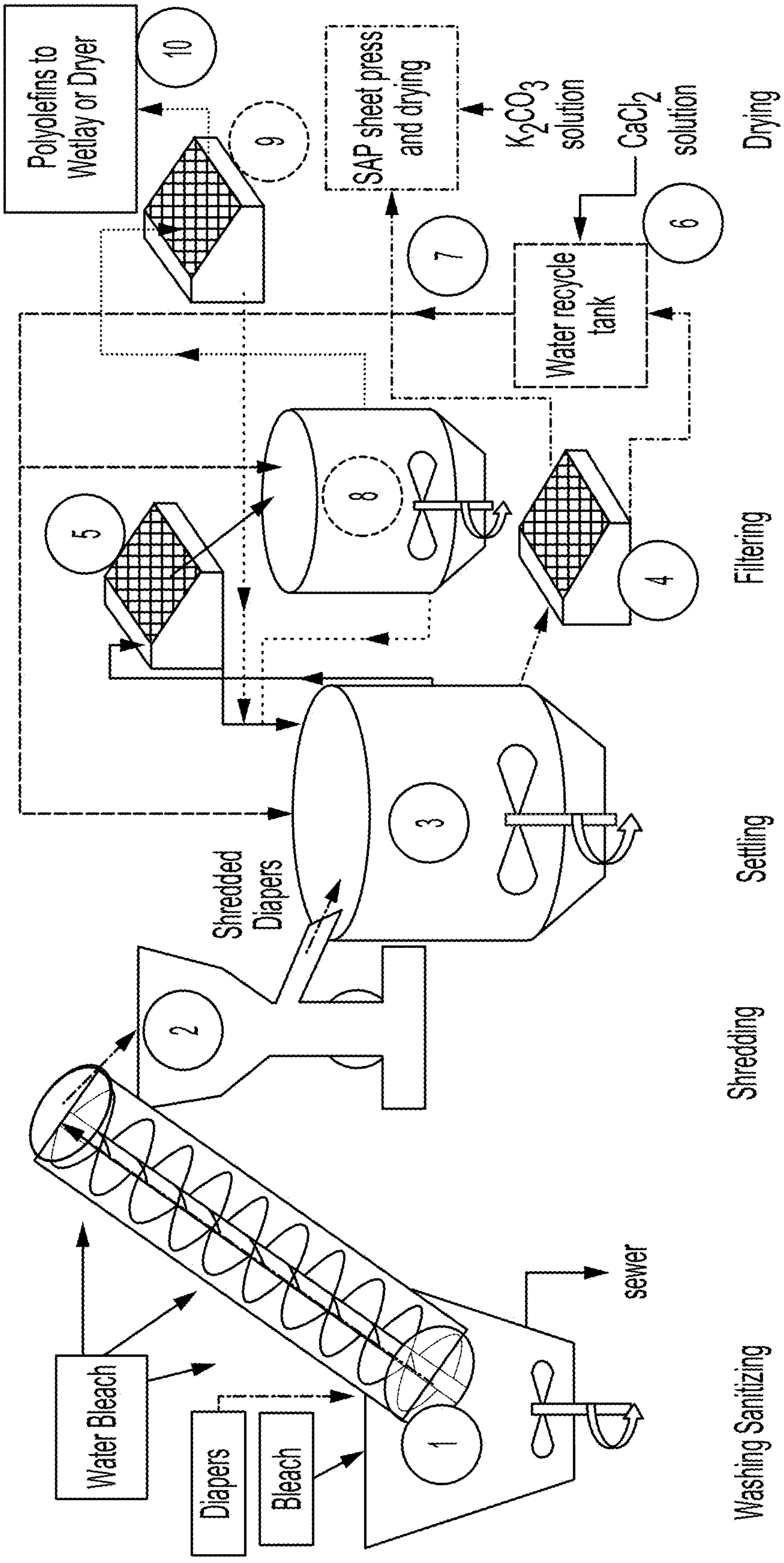
FIG. 1 presents one embodiment in schematic view of a Diaper Recycling Pilot Plant Design.

A tree or plant protection mat is provided, comprising:
- a top layer, having a first perimeter edge;
- a water-permeable bottom layer, having a second perimeter edge affixed either directly to the first perimeter edge, or indirectly to the first perimeter edge via an intervening sidewall; and
- a water-absorbing and releasing center layer disposed between the top and bottom layers, and comprising a section having superabsorbent particles and a section not having superabsorbent particles.

A method of protecting or encouraging the growth of a tree or plant is provided, comprising placing the tree or plant protection mat on soil near which the tree or plant is planted.

A tree or plant fertilization mat is provided, comprising:
- a top layer, having a first perimeter edge;
- a water-permeable bottom layer, having a second perimeter edge affixed either directly to the first perimeter edge, or indirectly to the first perimeter edge via an intervening sidewall; and
- a fertilizing center layer disposed between the top and bottom layers, and comprising fertilizer.

A method of fertilizing a tree or plant is provided, comprising placing the tree or plant fertilization mat on soil near which the tree or plant is planted.

A soil moisture stabilization mat for infrastructure located in or on the ground is provided, comprising:
- a top layer, having a first perimeter edge;
- a water-permeable bottom layer, having a second perimeter edge affixed either directly to the first perimeter edge, or indirectly to the first perimeter edge via an intervening sidewall; and
- a water-absorbing and releasing center layer disposed between the top and bottom layers, and comprising a section having superabsorbent particles and a section not having superabsorbent particles.

A method of reducing the occurrence of damage to infrastructure located in or on the ground is provided, comprising placing the soil moisture stabilization mat on the ground near, around or above the infrastructure.

A method of reducing the occurrence of damage to infrastructure located in or on the ground is provided, comprising placing a soil moisture stabilization mat on the ground near, around or above the infrastructure, wherein the soil moisture stabilization mat comprises:
- a top layer, having a first perimeter edge;
- a water-permeable bottom layer, having a second perimeter edge affixed either directly to the first perimeter edge, or indirectly to the first perimeter edge via an intervening sidewall; and
- a water-absorbing and releasing center layer disposed between the top and bottom layers, and comprising superabsorbent particles.

A method of stabilizing soil moisture in expansive or other soil is provided, comprising placing a soil moisture stabilization mat on the soil, wherein the soil moisture stabilization mat comprises:

a top layer, having a first perimeter edge;

a water-permeable bottom layer, having a second perimeter edge affixed either directly to the first perimeter edge, or indirectly to the first perimeter edge via an intervening sidewall; and a water-absorbing and releasing center layer disposed between the top and bottom layers, and comprising superabsorbent particles.

A method of using a soil moisture stabilization mat is provided for both plant protection and foundation protection with plants grown around outer perimeters of the mat.

DETAILED DESCRIPTION OF THE SEVERAL EMBODIMENTS

In one embodiment, the superabsorbent particles are free to move within the section of the center layer having superabsorbent particles, or are not free to move within the section having superabsorbent particles. For example, the superabsorbent particles may be fixed or embedded in a matrix in the center layer, such as a non-woven fibrous matrix. Alternatively, the superabsorbent particles may be free particles that can move and shift around in the center layer section having the particles.

In one embodiment, the mat comprises a hole through the top, bottom, and center layers through which a tree or plant can grow, the hole being defined by an interior perimeter edge at which the top and bottom layers are affixed directly to one another, or affixed indirectly to one another via an intervening interior perimeter sidewall.

In one embodiment, the mat comprises an access slit extending from the hole to the first and second perimeter edges, the access slit being defined by access slit perimeter edges at which the top and bottom layers are affixed directly to one another, or affixed indirectly to one another via intervening access slit perimeter edges sidewalls. The access slit is intended to allow the mat to be placed around the base of a tree or plant, the access slit leading to the hole that accommodates the tree or plant.

In one embodiment, the mat comprises one or more connections between the access slit perimeter edges, to connect the opposing sides of the access slit together after the mat has been placed around a tree or plant.

In one embodiment, the mat connections are selected from the group consisting of ties, grommets, Velcro, Velcro tabs, zipper, buttons, snaps, hooks, string, cord, or any combination of two or more thereof.

In one embodiment, the mat does not comprise a hole through the top, bottom, and center layers.

In one embodiment, the mat comprises a hole, or more than one hole, but does not have an access slit. This is to allow the mat to be laid down over small plants, or to allow planting in the holes after the mat has been laid down.

In one embodiment, the mat top layer reduces or prevents evaporative water loss from the center layer.

In one embodiment, the mat top layer is permeable to one or more of water, atmospheric water, dew, rainwater, applied water, or a combination of two or more thereof.

In one embodiment, the mat top layer further comprises one or more perforations, funnel, hole, opening, channel, seam, or a combination of two or more thereof, to permit one or more of atmospheric water, dew, rainwater, applied water, or a combination of two or more thereof to penetrate into the center layer.

In one embodiment, the mat the top layer is flexible.

In one embodiment, the mat top layer is flexible and is made of fabric, woven material, non-woven material, film, plastic, laminate, sheeting, polymer, or a combination of two or more thereof.

In one embodiment, the mat top layer is polypropylene, polyethylene, polyvinylchloride, polyester, polyurethane, polylactic acid, acrylic, rubber, rayon, cellulose, cotton, burlap, canvas, hemp, paper, biodegradable, biomaterial, bio-based plastic, processed bio-based material, reclaimed plastic, recycled plastic, recycled diaper, recycled rubber, wood, bamboo, agricultural residue, natural weed control fabric, mulch film, WeedGuardPlus® mulch film, biodegradable paper weed barrier, biodegradable natural weed barrier fabric, biodegradable mulch weed barrier, weed barrier film, weed barrier fabric, polylactic acid fabric, plant-based fiber, seed hairs, cotton, stem fiber, bast fiber, flax, straw, hemp, leaf fiber, sisal, husk fiber, coconut fiber, corn fiber, animal-based fiber, wool, hair, secretion fiber, silk, aspen wood fiber, linen, wool, cashmere, jute, abaca, coir, flax, ramie, sisal, mohair, camel hair, angora wool, alpaca wool, straw, or a combination of two or more thereof.

In one embodiment, the mat top layer further comprises one or more containers with raised rim that can be in form of a funnel, tray, pan, dish, channel, slot, or a combination of two or more thereof, to collect one or more of atmospheric water, dew, rainwater, applied water, or a combination of two or more thereof before it penetrates into the center layer through the perforations at the bottom of the containers, the water being collected and guided into the center layer by the containers.

In one embodiment, the mat bottom layer further comprises one or more perforations, hole, opening, channel, seam, or a combination of two or more thereof, to permit the release of water from the center layer.

In one embodiment, the mat bottom layer is flexible.

In one embodiment, the mat bottom layer is flexible and is made of fabric, woven material, non-woven material, film, plastic, laminate, sheeting, polymer, or a combination of two or more thereof.

In one embodiment, the mat bottom layer is polypropylene, polyethylene, polyvinylchloride, polyester, polyurethane, polylactic acid, acrylic, rubber, rayon, cellulose, cotton, burlap, canvas, hemp, paper, biodegradable, biomaterial, bio-based plastic, processed bio-based material, reclaimed plastic, recycled plastic, recycled diaper, recycled rubber, wood, bamboo, agricultural residue, natural weed control fabric, mulch film, WeedGuardPlus® mulch film, biodegradable paper weed barrier, biodegradable natural weed barrier fabric, biodegradable mulch weed barrier, weed barrier film, weed barrier fabric, polylactic acid fabric, plant-based fiber, seed hairs, cotton, stem fiber, bast fiber, flax, straw, hemp, leaf fiber, sisal, husk fiber, coconut fiber, corn fiber, animal-based fiber, wool, hair, secretion fiber, silk, aspen wood fiber, linen, wool, cashmere, jute, abaca, coir, flax, ramie, sisal, mohair, camel hair, angora wool, alpaca wool, straw, or a combination of two or more thereof.

In one embodiment, the mat further comprises a sidewall.

In one embodiment, the mat is assembled by sewing the top and bottom layers together around their edges, leaving a center layer between them. Sections of the center layer with and without SAP are separated by sewing the top and bottom layers together along the lines dividing the center layer sections with and without SAP.

In one embodiment, the mat center layer is a hollow portion between the top and bottom layers, the top and bottom layers connected to each other around the edges of the top and bottom layers. SAP is contained in some center layer sections, and other center layer sections do not have SAP.

The arrangement of sections with and without SAP in the center layer is not particularly limited, and those sections can be arranged according to preference. For example, the sections (with and without SAP) can be in the same plane of the center layer and alternate (see, e.g., FIGS. 13, 20 and 21) or be in the same plane of the center layer and run lengthwise (see, e.g., FIG. 14). Alternatively, the sections with and without SAP can be arranged on top of one another or under one another.

The section of the center layer that does not have SAP can be empty, that is, it does not contain either SAP, water-absorbing material, wicking material, or active material, or it can contain an active material, such as fertilizer, insect repellent, animal repellent, fungicides, pesticides, herbicides, and insecticides, nutrients, and the like.

In one embodiment, SAP is the only water-absorbing and releasing material in the mat. In one embodiment, the center layer does not have polyurethane foam or crumb rubber, or other wicking material other than SAP.

In one embodiment, the mat further comprises animal repellent.

In one embodiment, the mat further comprises one or more insect-, bacteria-, and fungi-control agent.

In one embodiment, the mat further comprises one or more endophytic microbe or mycorrhiza spore.

In one embodiment, the mat sections are separated by stitching lines, heat sealing lines, adhesive lines, or a combination of two or more thereof.

In one embodiment, the mat superabsorbent particles (SAP) comprise polyacrylic acid polymer, polyacrylate polymer, starch-grafted polymer, polyacrylamide, ethylene maleic anhydride polymer, carboxymethylcellulose, polyvinyl alcohol, polyethylene oxide, starch grafted copolymer of polyacrylonitrile, Group IA salt of polyacrylic acid, copolymer of two or more thereof, bio-based super absorbent polymer TryEco Agrisorb™, starch-based super absorbent polymer, cellulose-based super absorbent polymer, biodegradable superabsorbent polymer, superabsorbent cellulosic hydrogel, or any combination thereof.

In one embodiment, one or more of the mat sections having superabsorbent particles or not having superabsorbent particles comprise one or more of fertilizer, slow release fertilizer, inorganic fertilizer, organic fertilizer, compost, sludge from waste water treatment plant, sewage sludge, anaerobically digested sludge, biomass by-product from brewery, manure, anaerobically digested animal manure, anaerobically digested biomass, pulp and paper waste, animal repellent, insect repellent, pesticide, fungicide, insecticide, herbicide, microbe, fungus, spore, or a combination of two or more thereof.

In one embodiment, the mat first and second perimeter edges are affixed to one another directly or to one another via an intervening sidewall via sewing, heat-sealing, friction-welding, laser-welding, ultrasonic-welding, induction-welding, radio-frequency-welding, heat-bonding, adhesive, solvent-welding, stapling, or a combination of two or more thereof.

In one embodiment, the mat sections of soaker hose, drip emitters or micro-spray emitters are inserted in between of the top and bottom layers and the soaker hose and the emitters can be connected to an irrigation system via connections such as a hose connector.

In one embodiment, the mat hose connector is attached to the top, bottom layer or the side wall with via sewing, heat-sealing, friction-welding, laser-welding, ultrasonic-welding, induction-welding, radio-frequency-welding, heat-bonding, adhesive, solvent-welding, stapling, or a combination of two or more thereof.

In one embodiment, the method is used in combination with an irrigation system, wherein sections of soaker hose, drip emitters or micro-spray emitters can be placed on top of the mat.

In one embodiment, the irrigation system is an automatic system that are electronically controlled based on the soil moisture level, which is determined using a soil moisture sensor buried underneath the mat.

In one embodiment, the infrastructure comprises one or more of a foundation, building, dwelling, house, road, roadbed, street, highway, pavement, sidewalk, railway, subway, runway, bridge, dam, pier, utility, utility pole, utility tunnel, tunnel, pipeline, buried conduit, tower, airport, sewage line, gas line, water pipe, storage tank, or a combination of two or more thereof.

In one embodiment, the soil moisture stabilization mat further comprises one or more insect-, bacteria- and fungi-control agent.

In one embodiment, the damage comprises one or more of a crack, buckling, sinking, lifting, shifting, translocation, upheaval, collapse, or a combination of two or more thereof.

In one embodiment, the method reduces the occurrence of cracks appearing in a building's foundation.

In one embodiment, the soil stabilization or foundation mat is used in combination of existing irrigation system such as soaker hoses, drip emitters and micro-spray emitters.

In one embodiment, the irrigation system is an automatic system that are electronically controlled based on soil moisture level, which is determined using a soil moisture sensor buried underneath the mat or based on the stress level exerted on the foundation wall, which is determined by a sensor placed in between the foundation wall and the soil.

In one embodiment, the mat center layer further comprises one or more animal repellents.

Non-limiting examples of animal repellents may suitably include one or more of dried blood, putrescent egg solids, Garlic oil, Mint oil, Cedar oil, urine granules of predators such as fox coyote, Rosemary Oil, Peppermint Oil, Cottonseed Oil, castor oil, cinnamon oil, pepper powders, acephate, piperine, clove oil, capsaicin oil, spearmint oil. See, for example, U.S. Pat. Nos. 3,069,314, 4,179,499, and 4,940,583.

Non-limiting examples of target animals for repelling may include rabbits, deer, rodents, mole, mice gophers, snakes, birds.

In one embodiment, the mat center layer further comprises one or more insect, bacteria or fungi control agents.

Non-limiting examples of more insect, bacteria and fungi control agents include pesticides and biocides to control pests, which includes microorganisms, plants, animals that are detrimental to humans and human concerns. Pesticides may include the following types: Organophosphate, Carbamate, Organochlorine, Pyrethroid, and Sulfonylurea pesticides, as well as biopesticides, which are derived from such natural materials as animals, plants, bacteria, and certain minerals as opposite to synthetic pesticides. Depending on the pests type to control, it may include antimicrobials and/or biocides for kill microorganisms (such as bacteria and viruses), fungicides for killing of fungi (including blights, mildews, molds, and rusts), herbicides for killing of weeds and other plants that grow where they are not wanted, insecticides for killing insects and other arthropods, miticides, for killing mites that feed on plants and animals, microbial pesticides, which are microorganisms that kill, inhibit, or out compete pests, including insects or other microorganisms, molluscicides for killing of snails and slugs, nematicides for killing nematodes (microscopic, worm-like organisms that feed on plant roots), ovicides for killing eggs of insects and mites, pheromones, which is biochemicals used to disrupt the mating behavior of insects, repellents, which are used to repel pests, including insects (such as mosquitoes) and birds, and rodenticides for controlling mice and other rodents.

Non-limiting examples of target insects may include ants, Adelgids (including Hemlock Woolly Adelgid), Aphids, Leaf Beetles (including elm and willow leaf beetles), Borers (including Emerald Ash Borer, Asian Long-horned Beetle and Bronze Birch Borer), Lacebugs, Leafhoppers, Leaf miners, Mealybugs, Psyllids, Scale Insects, Whiteflies, phytophagous mites, scale crawlers, thrips, Flies, Sawflies, Caterpillars, Beetles, Weevils, Mole Crickets, Mushrooms Flies, Leaf chewing insects including Caterpillars, Pine Tip Moth, Winter Moth, Gypsy Moth, Eastern Tent Caterpillars, Fall Cankerworm, Fall Webworm, Spider Mites, Boxelder Bugs In one embodiment, the mat center layer further comprises one or more fungicides, pesticides, herbicides, and insecticides and insect repellents Non-limiting examples of fungicides, pesticides, herbicides, and insecticides and insect repellents may suitably include Aldrin, Chlordane, Chlordecone, Dichlorodiphenyltrichloroethane (DDT), Dieldrin, Endosulfan, Endrin, Heptachlor, Hexachlorobenzene, Lindane (gamma-hexachlorocyclohexane), Methoxychlor, Mirex, Pentachlorophenol, Dichlorodiphenyldichloroethane (DDD), Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulfoton, Ethoprop, Fenamiphos, Fenitrothion, Fenthion, Fosthiazate, Malathion, Methamidophos, Methidathion, Mevinphos, Monocrotophos, Naled, Omethoate, Oxydemeton-methyl, Parathion, Parathion-methyl, Phorate, Phosalone, Phosmet, Phostebupirim, Phoxim, Pirimiphos-methyl, Profenofos, Terbufos, Tetrachlorvinphos, toxaphene, Tribufos, Trichlorfon, Aldicarb, Bendiocarb, Carbofuran, Carbaryl, Dioxacarb, Fenobucarb, Fenoxycarb, Isoprocarb, Methomyl, 2-(1-Methylpropyl) phenyl methylcarbamate, Allethrin, Bifenthrin, Cyhalothrin, Lambda-cyhalothrin, Cypermethrin, Cyfluthrin, Deltamethrin, Etofenprox, Fenvalerate, Permethrin, Phenothrin, Prallethrin, Resmethrin, Tetramethrin, Tralomethrin, Transfluthrin, Acetamiprid, Clothianidin, Imidacloprid, Nithiazine, Thiacloprid, Thiamethoxam, Benzoylureas, Diflubenzuron, Flufenoxuron, Cyromazine, Methoprene, Hydroprene, Tebufenozide, Chlorantraniliprole, Cyantraniliprole, Flubendiamide, Anabasine, Anethole, Annonin, Asimina (pawpaw tree seeds), Azadirachtin, Caffeine, Carapa, Cinnamaldehyde, Cinnamon leaf oil, Cinnamyl acetate, Citral, Deguelin, Derris, *Desmodium caudatum* (leaves and roots), Eugenol, Linalool, Myristicin, *Nicotiana rustica* (nicotine), *Peganum harmala*, Oregano oil, Polyketide, Pyrethrum, Quassia, Ryanodine, Tetranortriterpenoid, Thymol, *Bacillus sphaericus, Bacillus thuringiensis, Bacillus thuringiensis aizawi, Bacillus thuringiensis israelensis, acillus thuringiensis kurstaki, Bacillus thuringiensis tenebrionis*, Nuclear Polyhedrosis virus, Granulovirus, Spinosad, Spinosyn D, *Lecanicillium lecanii*, (3-ethoxypropyl)mercury bromide, 2-methoxyethylmercury chloride, 2-phenylphenol, 8-hydroxyquinoline sulfate, 8-phenylmercurioxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulfide, benalaxyl, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, bixafen, blasticidin-S, Bordeaux mixture, boric acid, boscalid, bridged diphenyl fungicides, bromuconazole, bupirimate, Burgundy mixture, buthiobate, sec-butylamine, calcium polysulfide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroform, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper(II) carbonate, basic, copper fungicides, copper hydroxide, copper naphthenate, copper oleate, copper oxychloride, copper(II) sulfate, copper sulfate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, (1,2-Dibromo-3-chloropropane) DBCP, debacarb, decafentin, dehydroacetic acid, dicarboximide fungicides, dichlofluanid, dichlone, dichlorophen, dichlorophenyl, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, diniconazole-M, dinitrophenol fungicides, dinobuton, dinocap, dinocap-4, dinocap-6, dinocton, dinopenton, dinosulfon, dinoterbon, diphenylamine, dipyrithione, disulfiram, ditalimfos, dithianon, dithiocarbamate fungicides, (Dinitro-ortho-cresol) DNOC, dodemorph, dodicin, dodine, donatodine, drazoxolon, edifenphos, epoxiconazole, etaconazole, etem, ethaboxam, ethirimol, ethoxyquin, ethylene oxide, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, Fluconazole, fludioxonil, flumetover, flumorph, fluopicolide, fluoroimide, fluotrimazole, fluoxastrobin, fluquinconazole, flusilazole, flusulfamide, flutolanil, flutriafol, fluxapyroxad, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isopropyl alcohol, isoprothiolane, isovaledione, kasugamycin, ketoconazole, kresoxim-methyl, Lime sulfur (lime sulphur), mancopper, mancozeb, maneb, mebenil, mecarbinzid, mepanipyrim, mepronil, mercuric chloride, mercuric oxide, mercurous chloride, mercury fungicides, metalaxyl, metalaxyl-M (a.k.a. Mefenoxam), metam, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, morpholine fungicides, myclobutanil, myclozolin, N-(ethylmercury)-p-toluenesulfonanilide, nabam, natamycin, nystatin, β-nitrostyrene, nitrothal-isopropyl, nuarimol, octhilinone, ofurace, oprodione, organomercury fungicides, organophosphorus fungicides, organotin fungicides, orthophenyl phenol, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulfamide fungicides, phosdiphen, Phosphite, phthalide, phthalimide fungicides, picoxystrobin, piperalin, polycarbamate, polymeric dithiocarbamate fungicides, polyoxins, polyoxorim, polysulfide fungicides, potassium azide, potassium polysulfide, potassium thiocyanate, probenazole, prochloraz, procymidone, propamocarb, propiconazole, propineb, proquinazid, prothiocarb, prothioconazole, pyracarbolid pyraclostrobin, pyrazole fungicides, pyrazophos, pyridine fungicides, pyridinitril, pyrifenox, pyrimethanil, pyrimidine fungicides, pyroquilon, pyroxychlor, pyroxyfur, pyrrole fungicides, quinacetol, quinazamid, quinconazole, quinoline fungicides, quinomethionate, quinone fungicides, quinoxaline fungicides, quinoxyfen, quintozene, rabenzazole, salicylanilide, silthiofam, silver, simeconazole, sodium azide, sodium bicarbonate, sodium orthophenylphenoxide, sodium pentachlorophenoxide, sodium polysulfide, spiroxamine, streptomycin, strobilurin fungicides, sulfonanilide fungicides, sulfur, sulfuryl fluoride, sultropen, 2-(Thiocyanomethylthio)benzothiazole (TCMTB), tebuconazole, tecloftalam, tecnazene, tecoram, tetraconazole, thiabendazole, thiadifluor, thiazole fungicides, thicyofen, thifluzamide, thymol, triforine, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, tridemorph, trifloxystrobin, triflumizole, triforine triticonazole, Undecylenic acid, uniconazole, uniconazole-P, urea fungicides, validamycin, valinamide fungicides, vinelozolin, voriconazole, zarilamid, zinc naphthenate, zineb, ziram, zoxamide, Diatomaceous earth, Borate, Borax, Boric Acid, Rosemary Oil, Peppermint Oil, Cottonseed Oil, Sulfonylurea herbicides: amidosulfuron, azimsulfuron, bensulfuron-methyl, chlorimuron-ethyl, chlorsulfuron ethoxysulfuron, flazasulfuron, flupyrsulfuron-methyl-sodium, halosulfuron-methyl, imazosulfuron, nicosulfuron, oxasulfuron, primisulfuron-methyl, pyrazosulfuron-ethyl, rimsulfuron, sulfometuron-methyl Sulfosulfuron, terbacil, triflusulfuron methyl bispyribac-sodium, cyclosulfamuron, and pyrithiobac-sodium.

Additionally, the pesticides and herbicides listed on the National List of Allowed and Prohibited Substances by the US Department of Agriculture (USDA) National Organic Program (NOP). The National List identifies the synthetic substances that may be used in organic crop and livestock production, and prohibits the use of certain natural toxic substances in organic production.

In one embodiment, the mat center layer further comprises Endophytic microbes or Endophytes. These are organisms, often fungi and bacteria that dwell within robust plant tissues by having a symbiotic association, for at least part of its life cycle without causing apparent disease. Endophytes are benign organisms that produce some compounds to promote plant growth or help survival of harsh environments.

In one embodiment, the mat center layer further comprises Mycorrhiza.

Mycorrhizas are commonly divided into ectomycorrhizas and endomycorrhizas. The two types are differentiated by the fact that the hyphae of ectomycorrhizal fungi do not penetrate individual cells within the root, while the hyphae of endomycorrhizal fungi penetrate the cell wall and invaginate the cell membrane. Endomycorrhiza includes arbuscular, ericoid, and orchid mycorrhiza, while arbutoid mycorrhizas can be classified as ectoendomycorrhizas. Monotropoid mycorrhizas form a special category.

Many plants form associations called mycorrhizae with fungi that give them access to nutrients in the soil, protecting against disease and toxicities. Mycorrhizas are especially beneficial for the plant partner in nutrient-poor soils. Mycorrhizal plants are often more resistant to diseases, drought, salinity and toxicity Because nutrients are often depleted in the soil, most plants form symbiotic relationships called mycorrhizae with fungi that integrate into the plant's root.

The relationship between plants and fungi is symbiotic because the plant obtains phosphate and other minerals through the fungus, while the fungus obtains sugars from the plant root.

The long extensions of the fungus, called hyphae, help increase the surface area of the plant root system so that it can extend beyond the area of nutrient depletion. Mycorrhizal mycelia are much smaller in diameter than the smallest root, and thus can explore a greater volume of soil, providing a larger surface area for absorption.

In one embodiment, such as shown in FIG. 1, a Diaper Recycling Pilot Plant Design includes: 1. sanitation and washing device, 2. shredder, 3. hydropulper and settling tank, 4. screen for SAP, 5. screen for polyolefin, 6. water recycle tank, 7. dryer for SAP, 8. optional additional separation tank, 9. optional additional screen for polyolefin, and 10. dryer for polyolefin plastics. Red line (shown between "Diapers" and elements 1 and 2): dirty diapers or shredded diapers; Green line (shown as solid between elements 3, 5 and 8, and shown as dotted: polyolefin rich upper layers; Purple line (shown between elements 3, 4 and 7): SAP rich lower layers; and Black (shown as solid line from element 5 to 6, and as dotted line from elements 8 and 9 to 6) and Blue lines (shown as solid from element 4 to 6 then to 8 and 3): water recycling.

Figure 13:
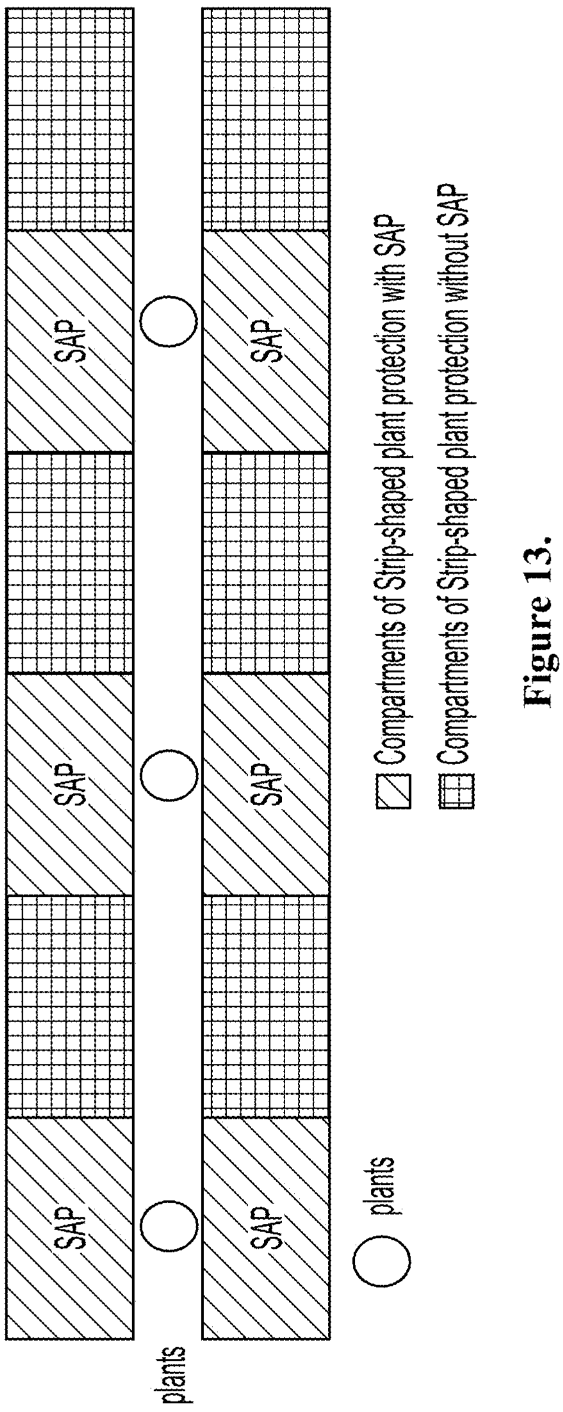
FIG. 13 shows a top view of one embodiment of the WCMC mat, in strip form placed on each side of a row of plants, and with alternating sections with and without SAP.

In one embodiment, such as shown in FIG. 13, two strip-shaped plant protection mats may be placed on each side of a row of plants. Alternatively, one strip-shaped plant protection mat may be placed on one side of a row of plants. Alternating sections with and without SAP are shown. Such a placement, and embodiment, might be desirable for grape vines, trees, shrubs, crops in nurseries, orchards, farms and vineyards. The long strip shaped plant protection mat can be made with multiple compartments that are separated, for example, with stitching lines, heat sealing lines, adhesive lines or any other methods described herein for joining the top and bottom layer to one another. Such an embodiment might be preferable for plants that are planted far from one other.

Figure 14:
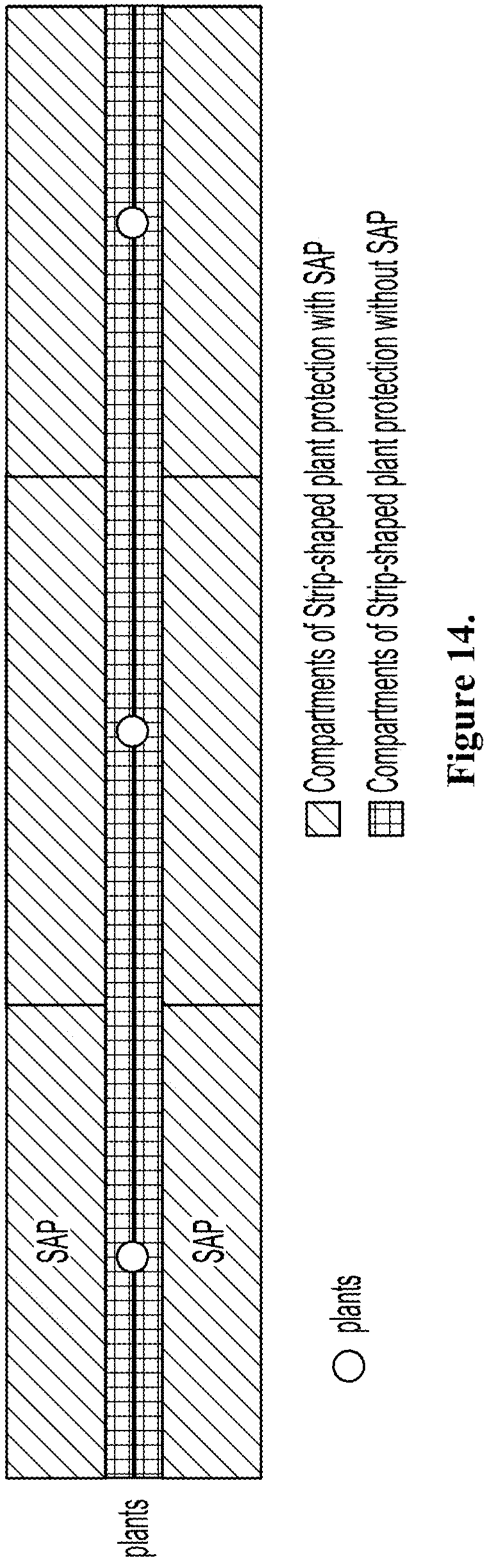
FIG. 14 shows a top view of one embodiment of the WCMC mat, in strip form placed on each side of a row of plants, and with lengthwise sections with and without SAP.

In one embodiment, such as shown in FIG. 14, two strip-shaped plant protection mats may be placed on each side of a row of plants, wherein the sections with and without SAP run the length of the mat. Such an embodiment might be preferable for plants that are planted close to each other.

Figure 16:
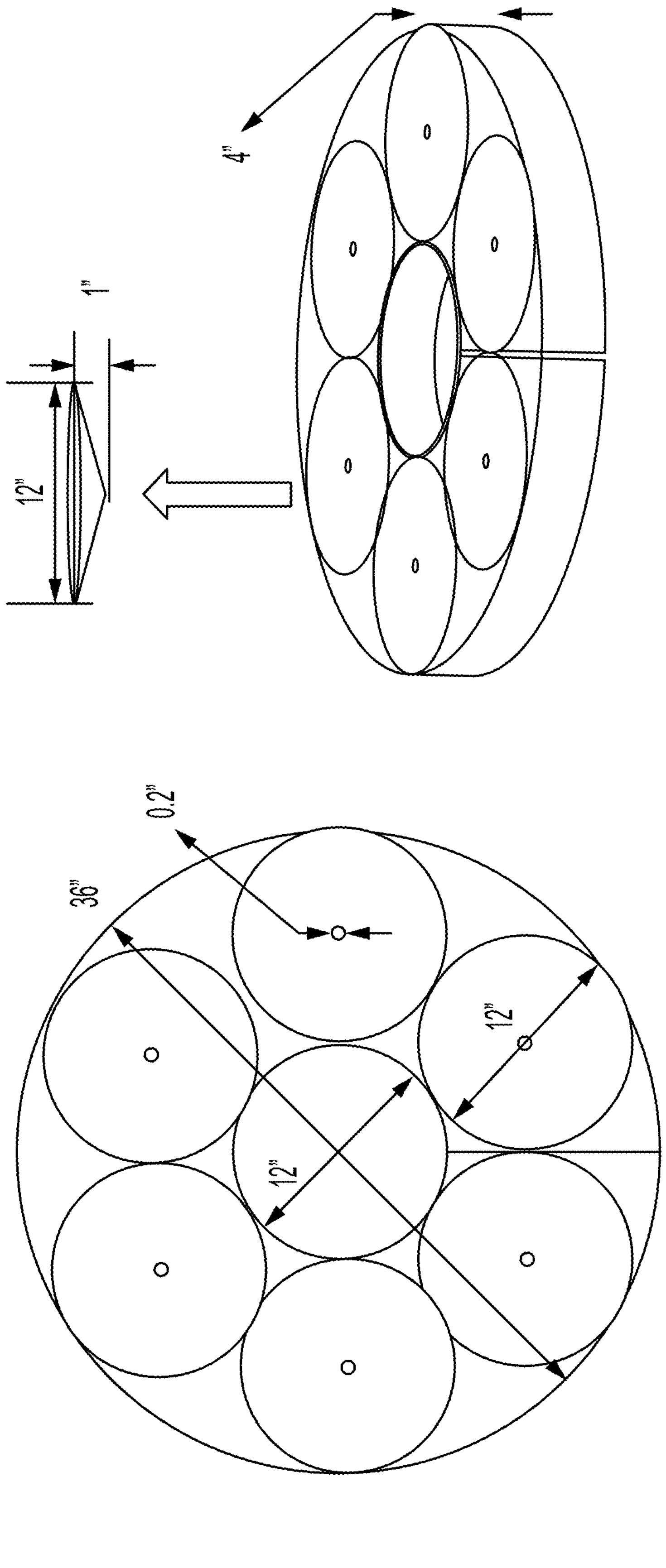
FIG. 16 shows top and perspective views of one embodiment of a top layer of a WCMC plant protection mat.

In one embodiment, such as shown in FIG. 16, the top layer of a plant protection mat may include one or more cones formed or sewn therein, which help to catch water and direct it downward into the center layer. The tip of each (inverted) cone may have a small hole, if desired, to help pass caught water into the center layer. Alternatively, the cone may be present and not have a hole at the bottom, or the cone may be made of permeable or semipermeable material that allows water to seep into the center layer, and reduce or eliminate evaporation of water from the center layer. In some embodiments, this type of top layer may be a flexible material, such as a fabric, or it may be made from a stiffer material, such as a plastic. Alternatively, the cones may be made from plastic, and sewn or affixed into a flexible material. Here, access slit is shown for placing the mat around an existing plant or tree. The access slit extends from the perimeter edge to the large hole in the interior, to accommodate a plant or tree. In one embodiment, the cone-shaped structures can be formed via Injection Molding, Blow Molding, Compression Molding, Film Insert Molding, Gas Assist Molding, Rotational Molding, Structural Foam Molding, and Thermoforming. The top cover with cone shaped structures can be connected to the bottom layer of the plant protection mat via sewing, heat sealing, adhesive, abrasion sealing or other joining methods. The materials that can be used to make the top cover includes polypropylene, polyethylene, polyvinylchloride, bio-based plastics, mixtures of materials such as the recycled diaper materials, polyester, polyurethane, rubber materials, recycled rubber materials, bio-based materials such as wood, bamboo, and agricultural residues, processed bio-based materials. The side wall can be made from the same materials and formed at the same time of the top cover is formed. It can be structural support for the top cover and collected water in the cones before they seep through the holes in the cones. The height of the sidewall, if present, may be any size desired, but in one embodiment may range from 0.5 inch to 10 inch in height. The use of a sidewall is to increase the water holding capacity of the plant protection mat for a certain shape and covered area.

Figure 17:
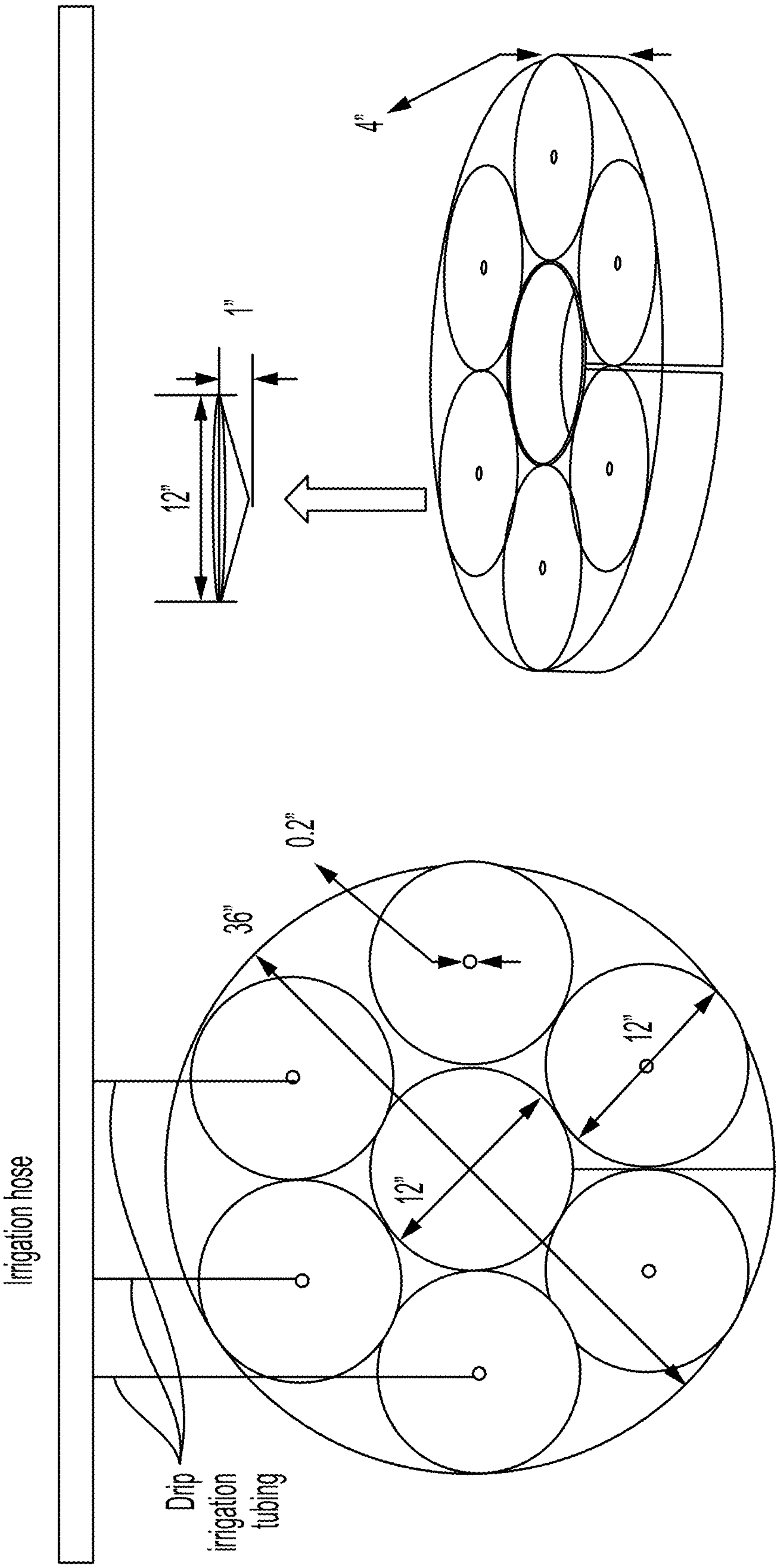
FIG. 17 shows top and perspective views of one embodiment of a top layer of a WCMC plant protection mat, in combination of drip irrigation tubing and an irrigation hose. One or more drip emitters or micro-spray nozzles may be connected to the drip irrigation tubing and placed inside of the mat or on top of the mat.
Figure 18:
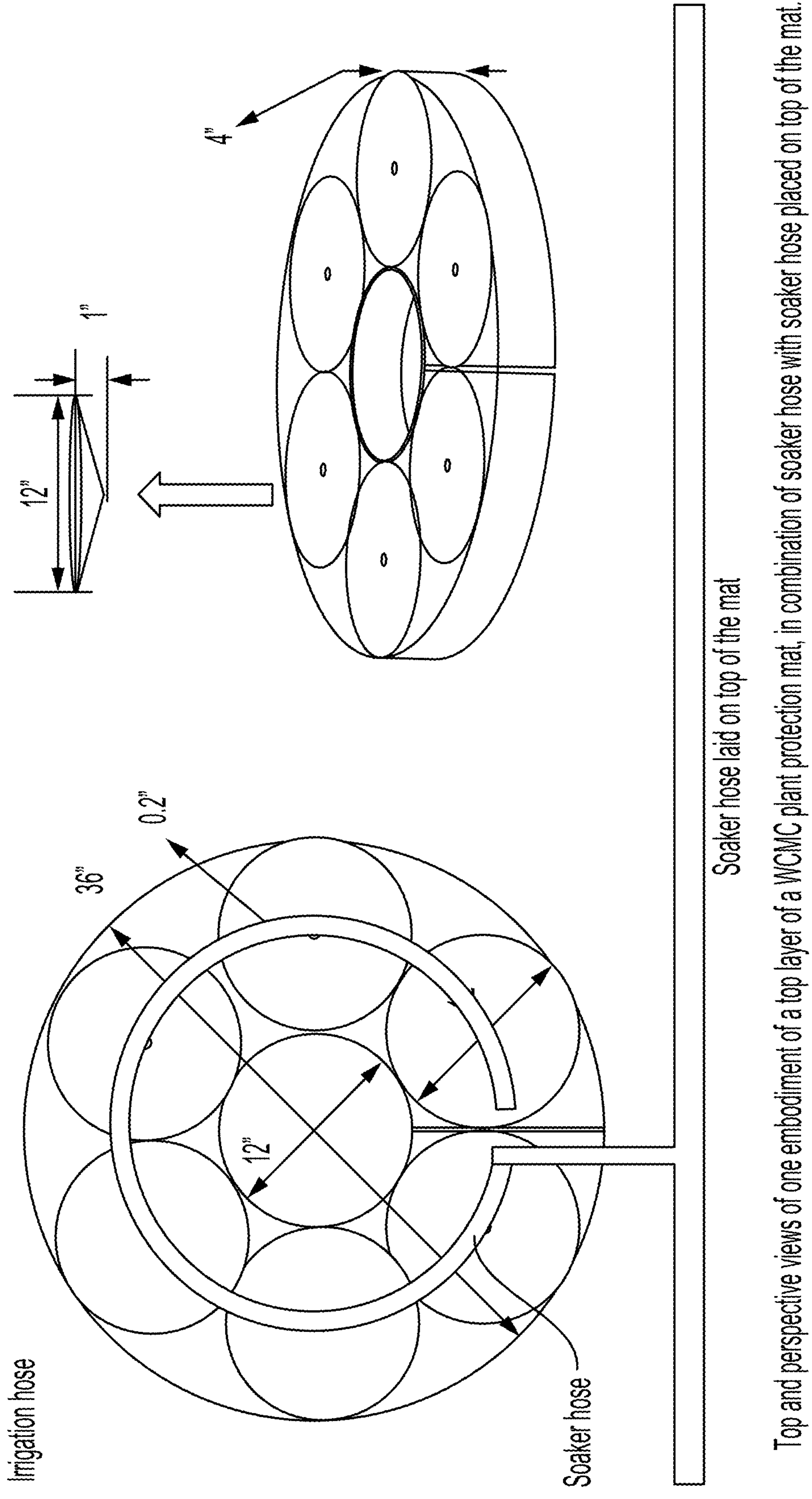
FIG. 18 shows top and perspective views of one embodiment of a top layer of a WCMC plant protection mat, in combination of soaker hose with soaker hose placed on top of a plant protection mat.

In one embodiment, such as shown in FIG. 17, the WCMC plant protection mat may be used in combination of drip irrigation tubing and an irrigation hose. One or more drip emitters or micro-spray nozzles connected to the drip irrigation tubing may also be placed inside of the mat or on top of the mat. Non-limiting examples of drip irrigation tubing and irrigation hose may be found in U.S. Pat. Nos. 2,752,201, 3,420,064, 3,586,239, and 3,604,72. The drip emitters or micro-spray nozzles may be connected to the drip irrigation tubing and placed inside of the mat or on top of the mat.

Figure 19:
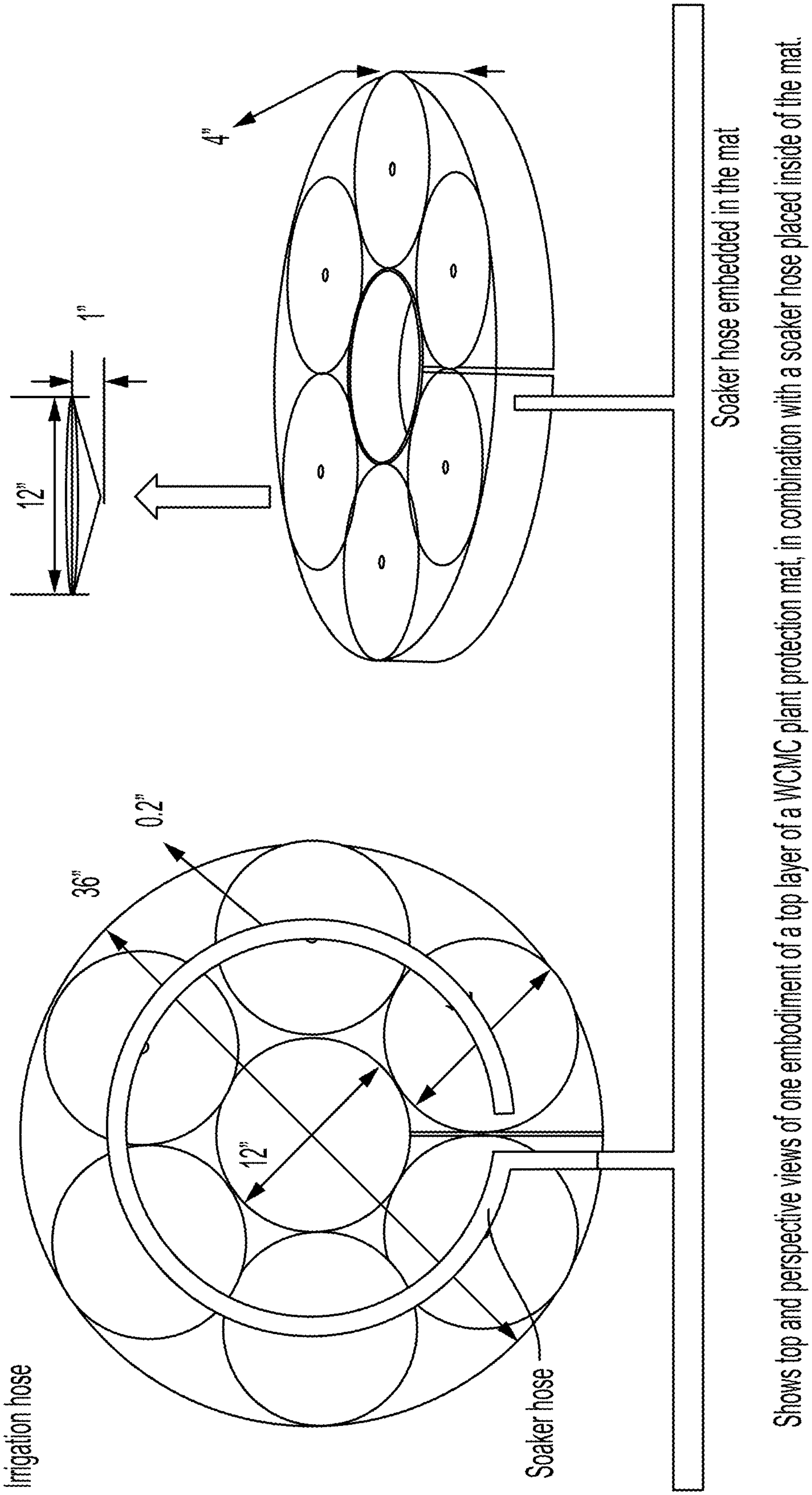
FIG. 19 shows top and perspective views of one embodiment of a top layer of a WCMC plant protection mat, in combination with a soaker hose placed inside of the mat.

In one embodiment, such as shown in FIG. 19, a WCMC plant protection mat can be used in combination with a soaker hose placed inside of the mat. The porous soaker hose is to be in contact with super absorbent materials or in contact with a wicking material that is in contact with super absorbent materials that makes the center layer of the plant protection mat. To connect the soaker hose with a water source, a threaded hose connector, e.g., garden hose threaded connector, male or female, ¾" MGHT (Male Garden Hose Thread) can be used. The hose connector can be joined to the mat via heat sealing, sewing, cable ties, twist tie, tape, Velcro straps, and plastic straps.

In one embodiment, such as shown in FIG. 20, the plant protection mat may be made of multiple segments that may be used together or assembled into one unit where there is a hole in the middle for plants to be planted or around one or more already planted plants. Each segment has all the segments of a plant protection mat and a top layer and a center layer, having sections with and without SAP, with edges sealed together. The assembled unit can have any shape, such as circle, rectangle, square, or a shaped of the place where plants will be planted. The plant protection can be made with multiple compartments that are separated with stitching lines, heat sealing lines, adhesive lines or any other methods of joining the top and bottom layer together. Right-hand side of figure shows an embodiment in which a single unit for placement around a tree or plant has four access slits, leading to a hole for accommodating a tree or plant.

In one embodiment, such as shown in FIG. 21, the plant protection mat may be made of multiple segments that assemble into one unit where there is a hole in the middle for plants to be planted or around one or more already planted plants. Each segment has all the segments of a plant protection mat and a top layer and a center layer with edges sealed together. The assembled unit can has any shape, such as circle, rectangle, square, or a shaped of the place where plants will be planted. The plant protection mat can be made with multiple compartments that are separated with stitching lines, heat sealing lines, adhesive lines or any other methods of joining the top and bottom layer together. Some compartments contains fertilizers that may include slow release fertilizer, inorganic and organic (compost) based fertilizers, sludge from waste water treatment plant, sewage sludge, anaerobically digested sludge, biomass by product from brewers, matures, anaerobically digested animal manures, anaerobically digested other biomass, Pulp and Paper Waste. Fertilizer can be in particulate shape or pressed into flat sheets. Fertilizers can also be mixed with SAP or pure. Right-hand side of figure shows an embodiment in which a single unit for placement around a tree or plant has four access slits, leading to a hole for accommodating a tree or plant.

In one embodiment, such as shown in FIG. 22, a plant protection mat may be made of multiple segments that assembles into one unit where there is a hole in the middle for plants to be planted or around one or more already planted plants. Each segment has all the segments of a plant protection mat and a top layer and a middle layer with edges sealed together. The assembled unit can has any shape, such as circle, rectangle, square, or a shaped of the place where plants will be planted. The plant protection mat can be made with multiple compartments that are separated with stitching lines, heat sealing lines, adhesive lines or any other methods of joining the top and bottom layer together. All compartments contains fertilizers that may include slow release fertilizer, inorganic and organic (compost) based fertilizers, sludge from waste water treatment plant, sewage sludge, anaerobically digested sludge, biomass by product from brewers, matures, anaerobically digested animal manures, anaerobically digested other biomass, Pulp and Paper Waste. Fertilizer can be in particulate shape or pressed into flat sheets. Fertilizers can also be mixed with SAP or pure.

In one embodiment, such as shown in FIG. 23, the WCMC mat may be flexible long tube to allow placement around several different plants, or it may be have a serpentine shape, or may be in a fractional-circumferential shape, such as one-quarter, one-half, three-quarters, or the like, which mats, so-shaped, can be connected together, or which may be not connected but used in combination to accommodate placement around different plants. Each mat may have sections with and without SAP. In one embodiment, one method of using a plant protection mat is to place one or more flexible long tube shaped WCMC mats in planters, flower pots and containers, garden beds, or ground to go around plants. The long strip shaped plant protection mat can be made with multiple compartments that are separated with stitching lines, heat sealing lines, adhesive lines or any other methods of joining the top and bottom layer together.

Development of Novel Weed and Moisture Control (WCMC) Mat From Recycled Disposable Diaper Materials Disposable baby and adult diapers account for 2% of all solid wastes that are accumulating in landfills. Currently, in the U.S., plastic materials recovered from disposable diapers are not accepted by recycling companies because the materials include a mixture of different plastics, as well as human waste.

At the same time, there is need for a product that can help trees to survive drought and suppress weed growth without using chemicals. The present inventors have designed and developed novel weed control and moisture conservation (WCMC) plant mat from recycled disposable diapers using an economically viable and environmentally benign method. The WCMC mat design includes three layers: a top cover that limits evaporation but allows rain water to seep in, a middle layer with superabsorbent polymer particles (SAP) that absorbs and stores water and releases it slowly, and a permeable bottom layer that allows water to pass through to the underlying ground. The bottom layer also blocks weed growth. In one embodiment, the WCMC mat can be heavy enough to keep the mat on ground, and prevent from reaching the ground. The mat exhibits superior weed control.

Low Cost and Environmentally Benign Recycling Process.

The process provides a low cost recycling and simple processing method, uses low cost materials and reduces energy cost. In one embodiment, a float/sink separation of diaper components using water as separation medium and low cost chemicals for sanitation with bleach (sodium or calcium hypochlorite), for SAP treatment with snow melt (calcium chloride) and for SAP recovery with potash fertilizer (potassium carbonate) was developed. But energy cost for drying SAP was significant as water content is very high in the recovered SAP/cellulose mixtures. In experiments, it was found that the water content has been dramatically reduced (>93%) by using higher concentrations of calcium cations with some scarification of recoverable absorbency in SAP. The excess calcium cations can be reused by recycling water from the separation process. Since most of the water used in the recycling process can be reused in the separation process, waste water amount is expected to be low, even at large scale operations. Waste water analysis results indicated that it is similar to sewage waste water. Current municipal waste water treatment plants can handle them without problems at a low quantity, and direct discharge into sewage is possible. Pretreatment may be needed for very large volume of waste water, but the treatment methods are readily available and economical.

Sheets were prepared from recovered diaper shell plastics using a wetlay and compression molding method. Integrity of the mat without addition of extra wood fiber was identified as a major problem. With addition of wood fiber to improve integrity of the wetlaid mats and molded sheets, mechanical testing reviewed that the physical properties of these sheets are sufficient for the intended application in a WCMC mat at a 500 micrometer thickness. The strength requirement was determined based on the wet weight and handling needs of one embodiment of the prototype WCMC mats, which is about 10 MPa or higher for 500 micrometer thick sheets.

One embodiment of the diaper recycling pilot plant is shown in FIG. 1. This plant includes five sequential steps: washing and sanitizing, shredding, settling, filtering, and drying. In this system, the collected soiled diapers are first sanitized and washed using the selected device as discussed above. To prevent noxious odors, soiled diapers may be stored in air-tight trash bags, which are opened in advance to provide adequate contact of diapers with bleach. Shredding is used.

The slurry and fluid handling from 3 to 4, 4 to 6, 5 to 3, and 6 to 3 may be accomplished by a sump pump. This will allow smooth handling of fluids without clogging while maintaining high separation efficiency and high production rate. Water removed from the upper layer polyolefins-rich slurry and lower layer SAP-rich slurry coming out of 3 may be filtered by using two different screens 4 and 5. 5 is a screen with large holes so that only the polyolefin fibers and strips will be removed from the rest of slurry, which will return back to 3. 4 is a screen with small holes to be used for filtering SAP out of water. Vacuum or press may be used to remove as much water as possible. The removed water may be pumped to the recycle tank 6 for reuse. $CaCl_2$ and bleach can be added to the recycle tank for two purposes: prevent bacteria growth in this tank and serve as a source of salt for the settling process. Prior to placing SAP in dryer 7, $K_2CO_3$ solution is sprayed onto the wet SAP. Recovery of SAP can be done in the dryer, and residual $K_2CO_3$ can be left in SAP. Dryer may be a forced air or other suitable dryer.

The subsystem including a settling tank 8 and a filter screen 9 (dotted lines for flow directions) may be repeated to obtain better separation for polyolefins. This subsystem can also be removed if such processing of recycled polyolefins fails. Incomplete removal of SAP particles from polyolefin strips and fibers result in poor mechanical properties, especially under wet conditions. The presence of swelled SAP particles create pores in the compression molded panels and ruins the mechanical properties. The lower layer from 8 and the water coming out the 9 will be returned back to 3.

High Throughput Manufacturing

Figure 2:
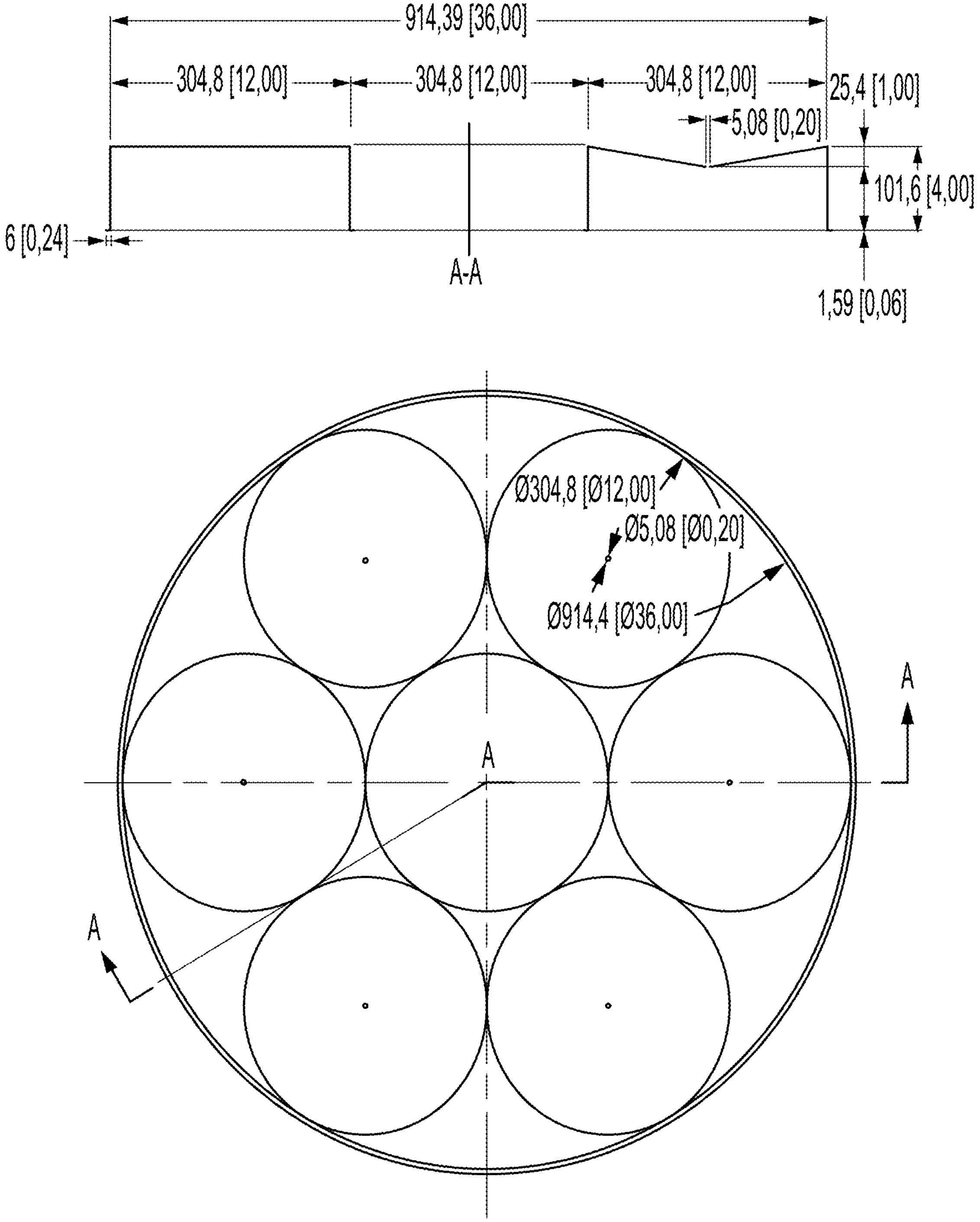
FIG. 2 shows one embodiment of a 1 WCMC mat 2D-CAD design for injection molding, thermoforming, or vacuum forming of top layer.

For plastic processing, injection molding, thermoforming and vacuum forming are usually much faster and more suitable for high volumes than other plastic processing methods. FIG. 2 illustrates a 2D-CAD drawing of a plastic tray with rain water collection funnels, a center tree hole, and a slit for deployment around the plant or tree. The larger sizes (diameter/linear dimension larger than 30 inches) will be too heavy for handling when they are soaked. Therefore, the design for them can be divided into two, three or four parts for manufacturing. This will reduce the tooling cost for the aforementioned plastic processing methods.

In one embodiment, any of the mats described herein may be produced with recycled diaper materials obtained by the diaper recycling process.

WCMC Mat Prototype and Evaluation.

Figure 3:
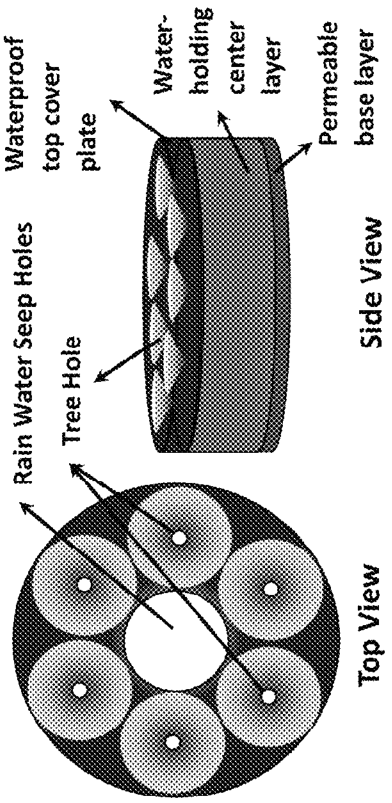
FIG. 3 shows a perspective and top view of a prior art plant protection mat.
Figure 4:
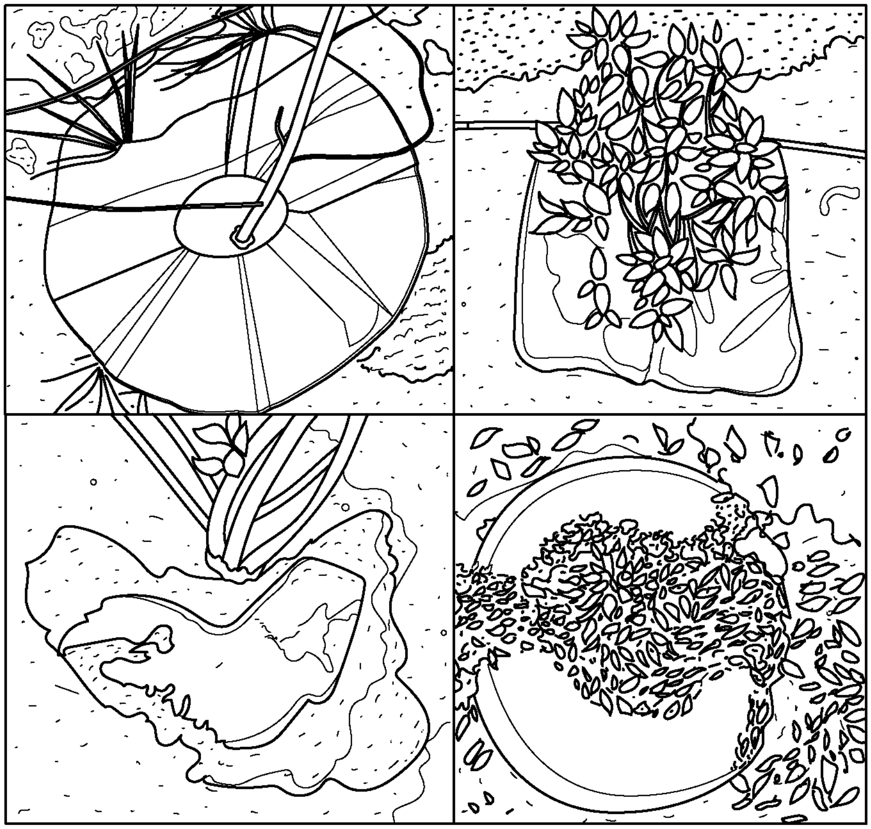
FIG. 4 shows four embodiments of prototype WCMC mats.

Concurrent to the recycling process, an evaluation was carried out with prototype WCMC mats. Because processing of recycled diaper plastics can only be possible after enough plastics are collected, the top and bottom covers of the prototype mat were made by weed barrier fabrics or ground cover fabrics. Because the demand for WCMC mats on field tests were high and SAP from diapers were not enough, the SAP layer had three types of SAP: recycled SAP from diapers, virgin SAP particles acquired from the market or a mixture of these two. Different sizes, shapes and combination of materials were used to make the prototypes. The material selection was to enhance the features of the WCMC mat in weed control (strong fabric to block weed growth), water conservation (slow down evaporation from top cover and allow rainwater to permeate) and delivery of water to root system (permeable bottom layer). Durability and UV stability is also an important factor for consideration as the mats are designed for outdoor usage. FIGS. 3 and 4 shows the prototype mats prepared for field and bioassay tests from weed barrier films and/or ground cover fabrics.

WCMC mats were fabricated and evaluated for performances under various conditions. WCMC mats can provide several benefits: (1) covering the soil to prevent soil surface evaporation, (2) maximizing soil water availability through elimination of competing vegetation (weed control), (3) providing a self-charging and slow-releasing water reservoir for plants, and (4) preserving fertilizer by reducing weed growth and irrigation/rain water runoff.

Controlled environment trials and field tests on multiple sites were carried out in greenhouses and in road medians, parks, landscaping grounds, vineyards, and nurseries. The results show that WCMC mats can suppress weed control and alleviate planting stress of trees, especially in drought conditions. WCMC mats have high potential for reducing water usage, labor and other maintenance costs while increasing survival rate of trees for urban forest management, park and recreation, and forest restoration.

Water Distribution Test.

This experiment was set up during the hottest part of the year. It was designed to determine whether water goes down into the soil, how fast water goes into the soil, and how much water goes into the soil. Potting soil was placed into flower pots under a rain exclusion shelter. The initial relative soil moisture was about 3-4 (on a scale from 1-10 with 1 being very dry and 10 being soaked). Prototype WCMC mats with about 15 lbs absorbed water were placed on the top of potting soil. Soil moisture levels were measured at 4-inch deep for 6 weeks. The weight of the WCMC mat and the total weight of pot plus mat were recorded.

Figure 5:
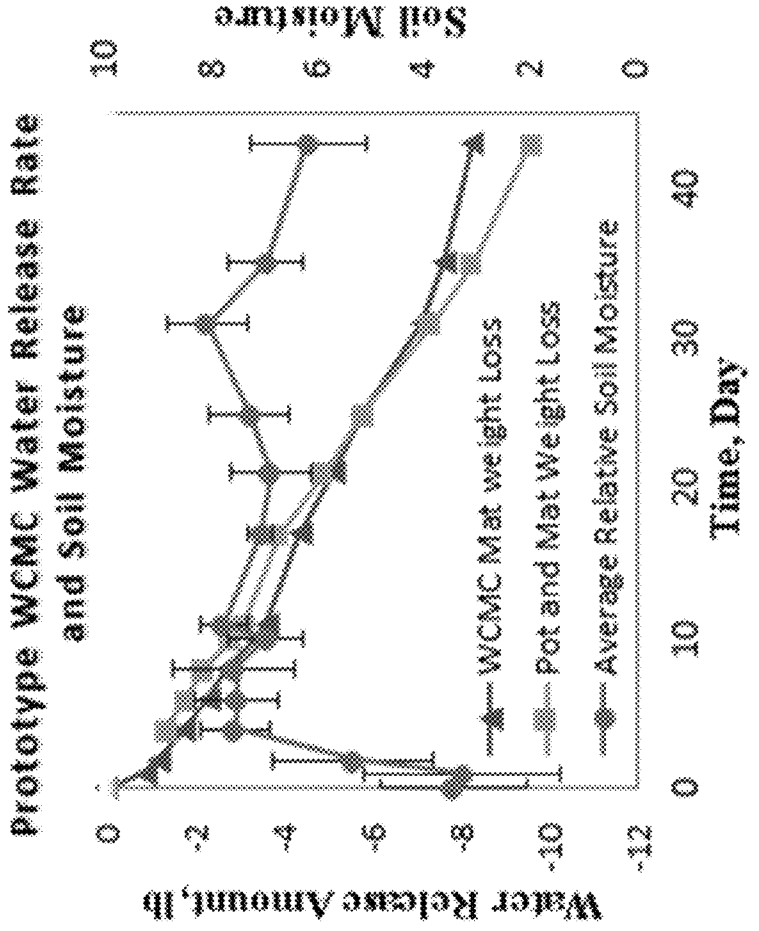
FIG. 5 shows data obtained for one embodiment of prototype WCMC matwater distribution test.

The results are shown in FIG. 5. It took 3 days for the soil moisture of 4 inches below surface to rise from 3 to 6. Then in the following 40 days, the soil moisture was observed at a rather high level (6-8). Weight loss of mat was larger than the total weight loss initially, indicating that water enters soil at the same time it evaporates from the mats and the potting soil. But the potting soil was observed to have has a net gain in water. After 25 days, the total weight loss is larger than weight loss of the WCMC mat. This suggests that the water in the mat became less available and there was more moisture evaporation than it obtained from the mat. At this point, more than half of the WCMC mat's absorbency capacity became available for compensation of evaporation or movement down into the soil.

Exposure to Drought in Sandy Soil

Sandy soil is known to have poor water retention properties and usually requires more frequent watering to be suitable for planting. This experiment was designed to determine whether the WCMC mat provides water retention and release that are necessary for seedlings to survive in drought in sandy soils. In this bioassay, the control group is seedlings without WCMC mats. Each group of eight seedlings was exposed an extended drought cycle.

Figure 6:
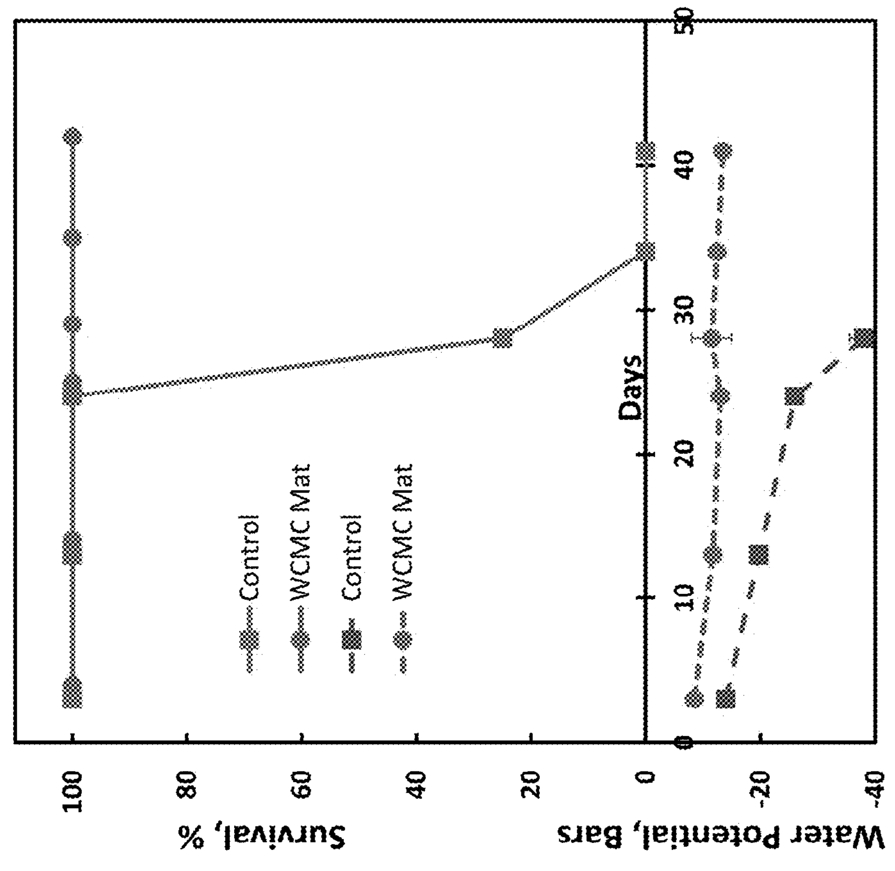
FIG. 6 shows data obtained for western red cedar seedlings water potential (lower chart) and survival rate (upper) in sandy soil.

The results show (FIG. 6) that the seedlings in the control group had much lower water potential (i.e. higher water stress) than those in the WCMC group. This suggests the poor water retention capability in sandy soil exposed the control seedlings to extreme drought conditions. Six out of eight control group seedlings died before 26 days, and none survived for 34 days. The seedlings in two WCMC groups all survived the trial period. The control group seedlings had minimal height growth, no diameter growth, and no root growth. The WCMC group had root growth throughout the soil profile, which helped the seedling survive the experiment period. A larger-sized and more sophisticated experiment is needed to be conclusive, but it is clear from this trial that WCMC mats can provide protections for trees against severe drought.

Testing of WCMC Mats Concept in Urban Forestry Management

Figure 7:
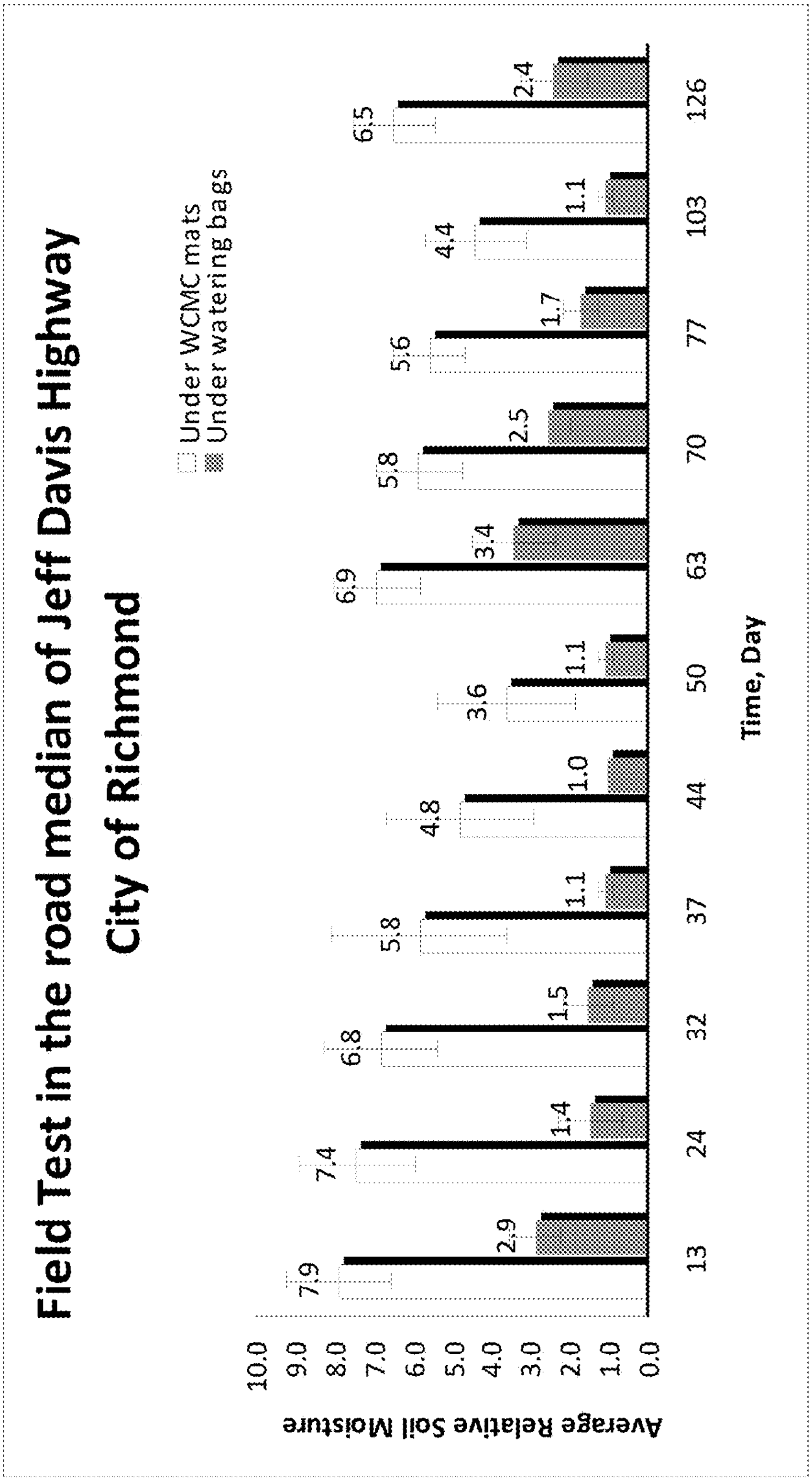
FIG. 7 shows soil moisture data for embodiments of WCMC mats compared to watering bags in the road median of a highway

The inventors installed 20 WCMC mats around trees in the median of a highway in August. Before the installment of WCMC mats, all of the trees had been previously relied on watering bags for water. FIG. 7 shows the soil moisture level under WCMC mats compared to that under watering bags (randomly selected from nearby trees). For most of time in an unusually wet summer with a late drought, soil moisture level under WCMC mats was from 4 to 8, which was most suitable for most plants to grow. It was at least 2 times higher than that under watering bags. Soil moisture data from two other field tests agrees with the data shown in FIG. 7.

Testing of WCMC Mats Concept in Nursery Production

Container and field trials under controlled and simulated watering environment following nursery daily schedules have been carried out about two months. This test was design to evaluate the water conservation capabilities of the WCMC mat to increase soil water availability and reduce irrigation for nursery crops in containers and in field. Drip irrigation methods are the standard operations at this nursery. There are two groups of experimental treatments: Group #1 for container plants, there are five testing trials with maple trees of similar size (Table 1); Group #2 for ground plants, there are six testing trials (Table 2).

TABLE 1

In-container Experimental Treatments

| Group # | Description | Treatment and Setup |
|---|---|---|
| GP#1 | Control Group, Standard Operation | No WCMC mat installed, regular drip irrigation with watering rate 7.0 GPH |
| GP#2 | WCMC Mats only | 18" WCMC mats installed, manual watering when needed only |
| GP#3 | WCMC Mats with combination of drip irrigation | 18" WCMC mats installed, watering rate 3.0 GPH |

TABLE 1-continued

| In-container Experimental Treatments | | |
|---|---|---|
| Group # | Description | Treatment and Setup |
| GP#4 | WCMC Mats with combination of drip irrigation | 18" WCMC mats, watering rate 5.0 GPH |
| GP#5 | WCMC Mats with combination of drip irrigation | 18" WCMC mats, watering rate 7.0 GPH |

TABLE 2

| In-field Experimental Treatments | | |
|---|---|---|
| Group # | Description | Treatment and Setup |
| GT#1 | Control Group, Standard Operation | No WCMC mat installed, regular watering with drip irrigation |
| GT#2 | WCMC Mats only | 2' × 2' WCMC mats installed, manual watering when needed only |
| GT#3 | WCMC Mats with combination of drip irrigation | 2' × 2' WCMC mats installed, daily watering rate 0.5 GPH |
| GT#4 | WCMC Mats with combination of drip irrigation | 2' × 2' WCMC mats, daily watering rate 1.0 GPH |
| GT#5 | WCMC Mats with combination of drip irrigation | 2' × 2' WCMC mats, daily watering rate 1.5 GPH |
| GT#6 | WCMC Mats with combination of drip irrigation | 18" WCMC mats, daily watering rate 2.0 GPH |

Figure 8:
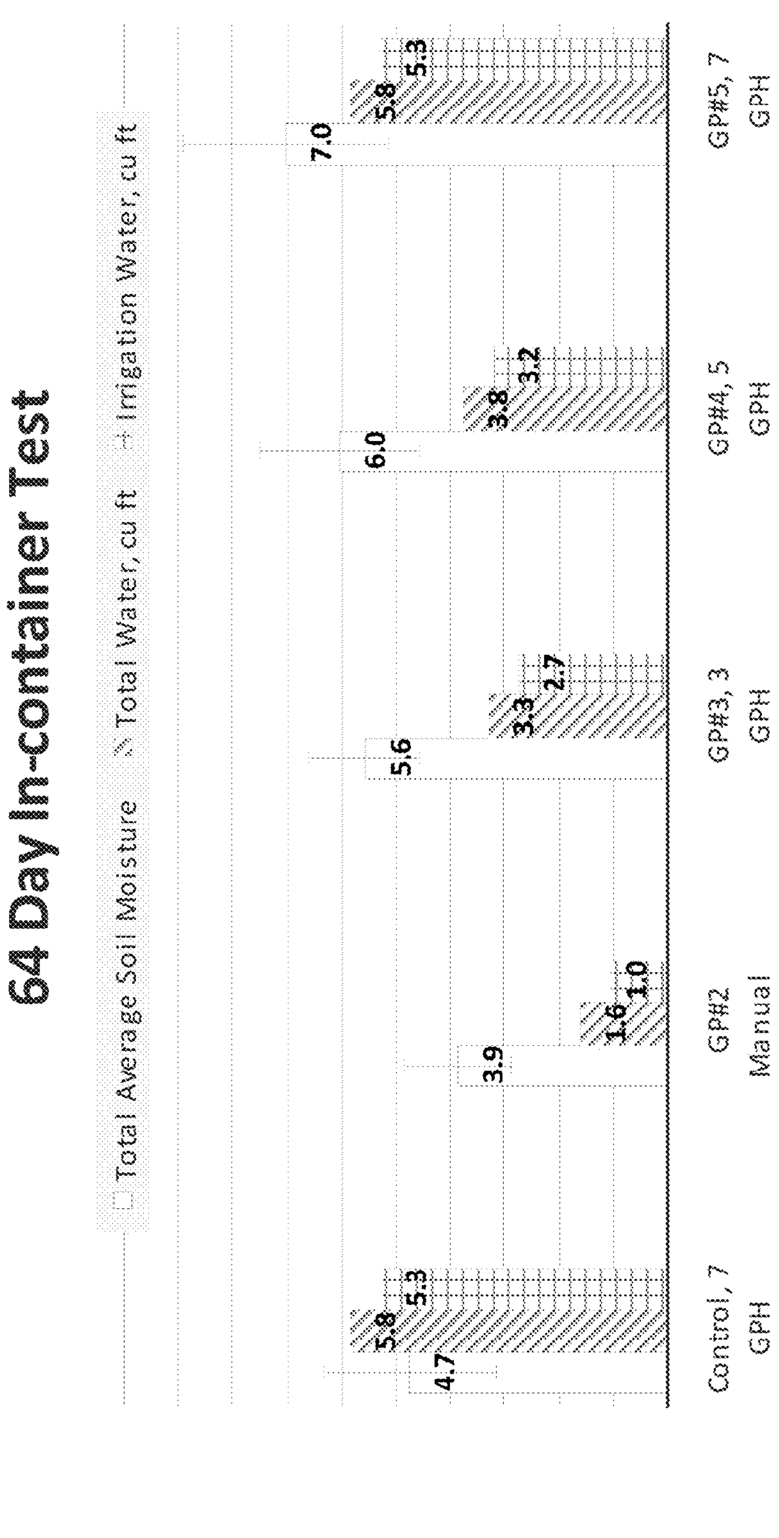
FIG. 8 shows data comparing water amount and soil moisture among different treatments for in-container tests.

The water usage and soil moisture were measured and recorded for 64 days, including rain precipitation (retrieved from weather.org). Plants in containers were watered on daily basis except for days on which it rained (62-day watering in 64 days). The results are shown in FIG. 8. These data indicate that current water usage in the nursery can be reduced from 5.3 to 2.7 cu ft for in-container plants with better results by using WCMC mats. It also means that these WCMC mats can save more than 50% of current water usage to maintain the same soil moisture level.

Figure 9:
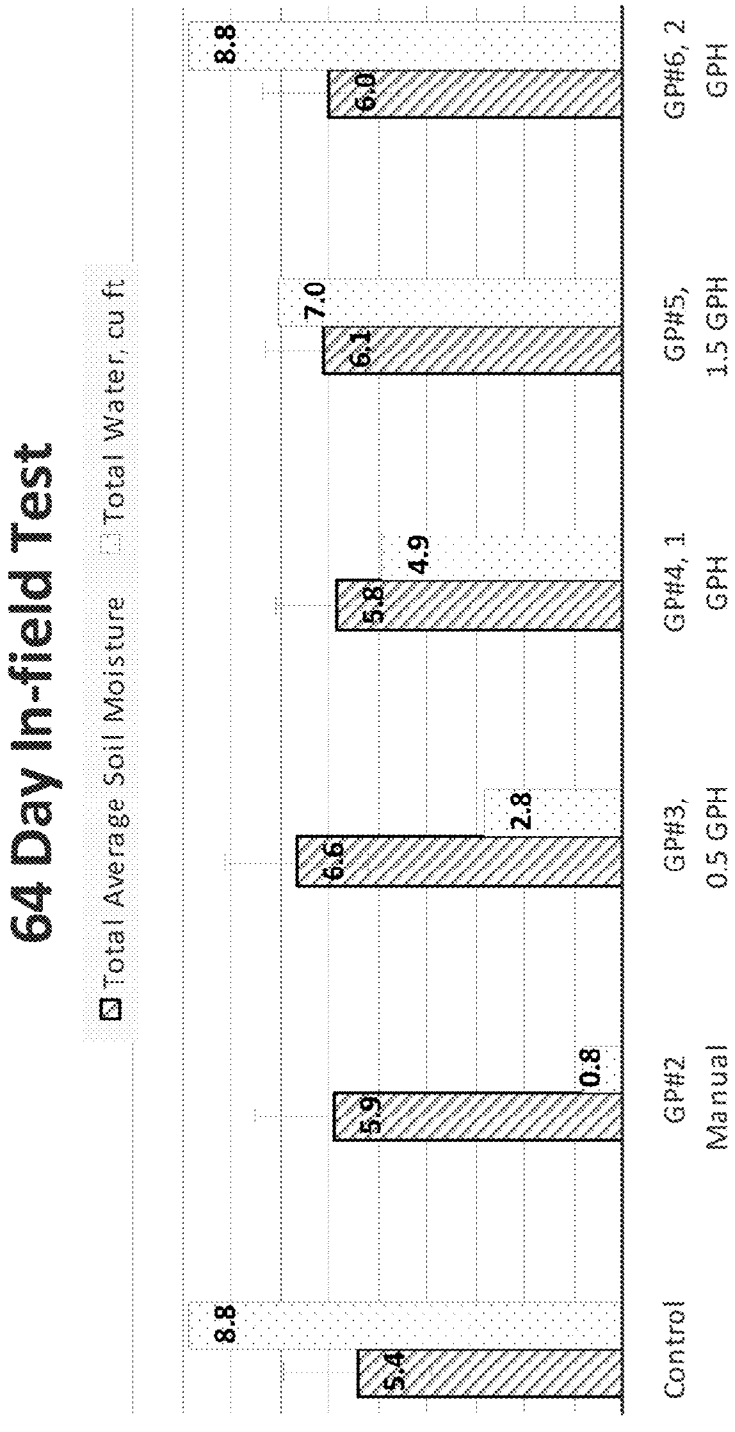
FIG. 9 shows data comparing water amount and soil moisture among different treatments for in-field tests.

It has been observed that in-field plants have been watered overnight each time in 4-day intervals (15 times in 64 days). Because of the long time watering and small measuring container (5 gal bucket), water were filled and overflowed many times for some treatments. Therefore, the total water usage recorded is underestimated, and the actual differences between treatments should be larger. The results are shown in FIG. 9. For the several times that bucket was overflowed, the measured amount of irrigation water is lower than what the plants actually received. These data indicate that WCMC mats can help maintain good soil moisture level for in-field plants with much less water usage. Considering the inaccuracy in water amount measurements, it does show that a large amount of water can be saved without scarifying plant growth.

Testing of WCMC Mats Concept in Urban Orchard

The present inventors installed 10 WCMC mats around fruit trees in an orchard, and watering bags were installed around 10 other trees in the same orchard. A variety of different fruit tree species was included. Although it cannot be considered as a scientifically sound experimental design of experiment, it provided an opportunity to test WCMC mats against regular watering using watering bags on different fruit trees. Orchard staff were on hand to fill the watering bags whenever there was less than one inch of rain during a 7-day period. WCMC mats were not watered throughout the year. It was found that the average relative soil moisture level under WCMC mats (~7.7) was higher than that under watering bags (~7.5).

Figure 10:
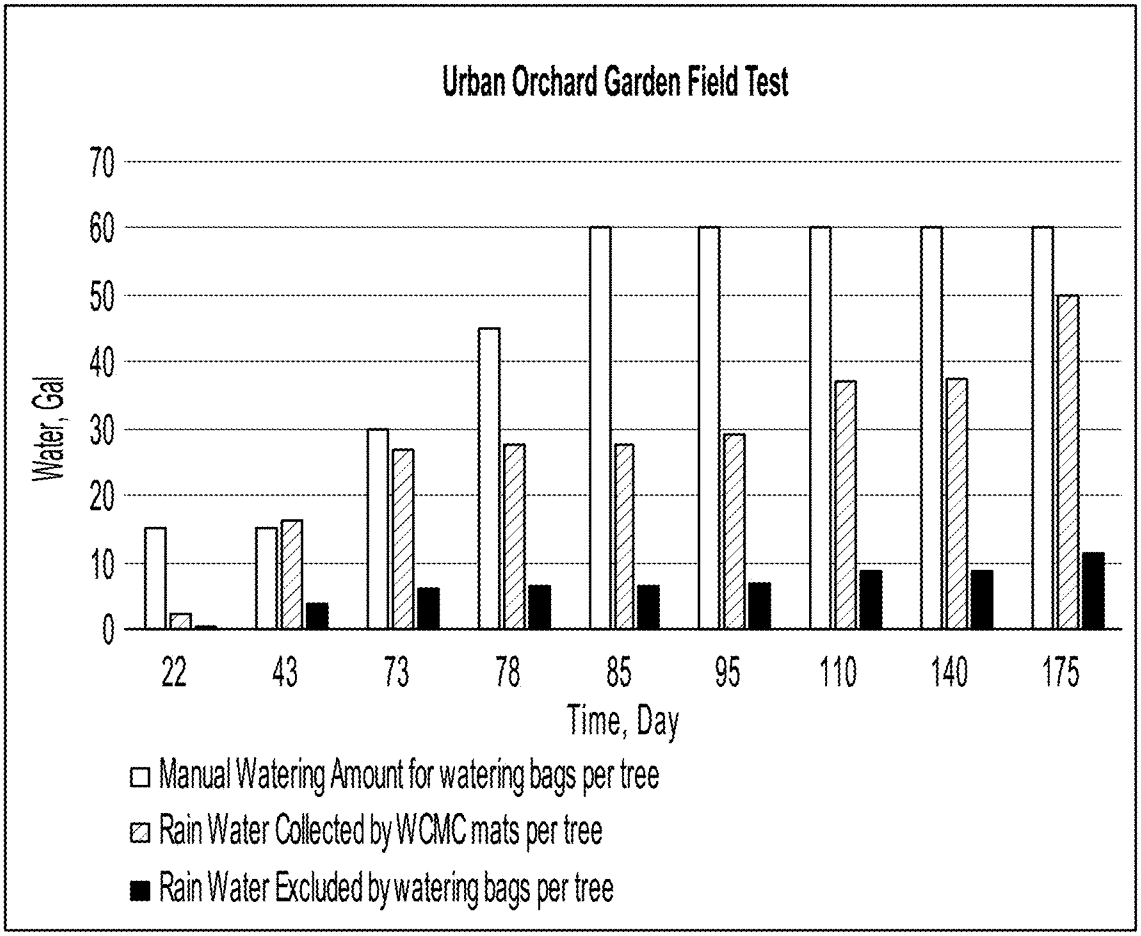
FIG. 10 shows data for accumulated rain water collected by WCMC mats, irrigation water and rain water shielded by watering bags per tree in an urban orchard field test.

Using an accurate watering record and precipitation record from weather.org, the amount of water received by each tree was determined. Watering bags were manually filled 4 times with total of 60 gallons for each tree. From June to December, WCMC mats received total of 26 inches of rain since the time of planting, which corresponds to 50 gallons during this period using 24 inch diameter mat and 4-inch diameter tree hole. It was assumed that all the rain water was collected and stored since runoff could not be estimated. Due to the cone shape (estimated diameter at bottom is 12 inches) of watering bags, rain is prevented from entering the soil beneath the bags. The total excluded rain water is estimated to be 11 gallons of rain water per tree. The accumulative water amount available for each tree is shown in FIG. 10. Although the numbers are not supported by actual measurements, the total water amounts are about same at the end of the 180 days period. It is in good agreement with the soil moisture level measurements. A few things might have been missed in the calculation: runoff rainwater from WCMC mats, runoff irrigation water from watering bags, and rainwater flows into the area covered by watering bags. It is also possible that a better estimation could be derived by including the measurement of runoff water amount.

Weed Management.

The overall weed control results of the WCMC mats are very good. First, the fabrics used to make the prototypes are commercially available weed barrier fabrics. Second, the swelled SAP secures the WCMC mat on the ground so that air and sunlight cannot reach weeds, which would die without photosynthesis. The weight of mats also provides extra pressure to prevent grass penetrating, which happens to single layer of weed fabrics. In experiments at a nursery farm, it was found that WCMC mats controlled weeds around the base of a sapling tree better than either sprayed weed killer or applied weed killer pellets.

For smaller sized WCMC mats tested in this experiment, air can reach the weeds underneath the WCMC mats as evidenced by the continual growth of weeds (white or pale colored leaves and stems) and weed roots for a period of time before they eventually die off. Fine roots of the trees were also found underneath the WCMC mats, indicating oxygen diffused to that location and allows the root growth. The death of the weeds was mainly due to the blocking of sunlight for a certain time.

However, in a separate experiment where larger sized WCMC mats were used, air blocking was found to contribute to the death of weeds when the weeds is far from the edges of the WCMC mats. It is evidenced by the rotten weed leaves and stems. During inspection, the inventors were experienced with the typical smell of the anaerobic respiration of microorganisms. The smell was particularly pronounced when recycled diaper materials (containing cellulose fibers and other organic materials), organic fertilizers and other organic matters were used. In one embodiment, dividing a large sized WCMC mats into multiple sections and leaving some of the sections without SAP, can be advantageous for certain applications.

Soil Temperature Measurement.

Figure 11:
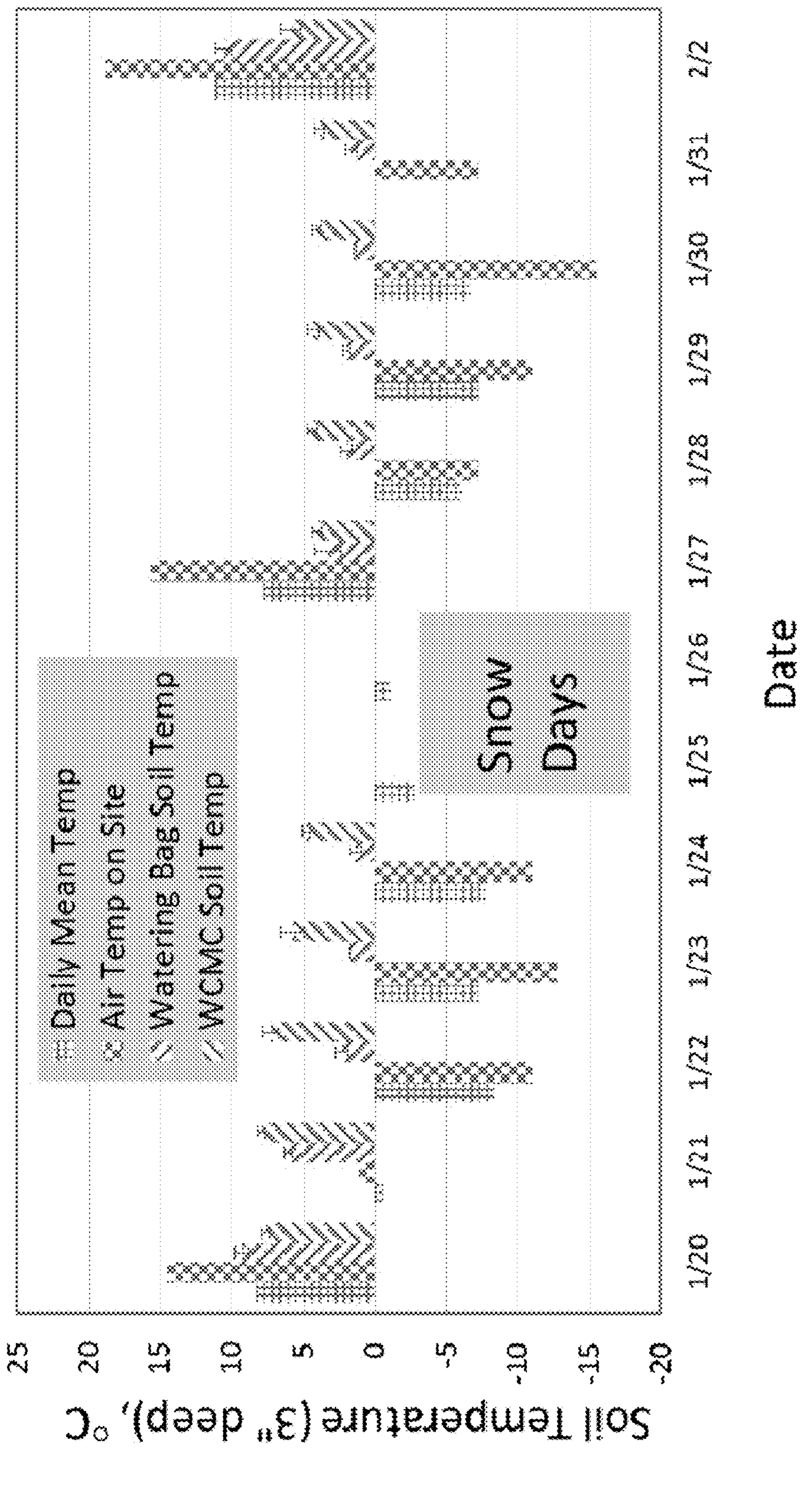
FIG. 11 shows data for soil temperatures (3" below soil surface) in the road median of a highway in January-February.

During a field trip to one testing site in October, the present inventors noticed a big temperature difference above and under the WCMC mats. A literature review on the temperature effects on root growth as well as plants in winter protection showed that 5-30° C. is the temperature range for root growth for most plants. Therefore, an experiment was designed to measure soil temperatures during winter. Soil temperatures were measured in the road median of a highway from January to February. Sensors were buried 3" below soil surface. In FIG. 11, daily mean or high temperatures (obtained from weather.org), air temperature on site when measurements were done (some were taken in early morning when temperature was close to the minimum temperature of the subject day), soil temperature under WCMC mats and watering bags are reported. The results showed that the soil temperature under WCMC mats remained around 5° C. in one of the coldest days in January, while the temperature under watering bags was about 1-2° C., that is, much colder. For a continuous cold period, the results showed the soil temperature under WCMC mats were also 3-5° C. higher than that under the watering bags.

Figure 12:
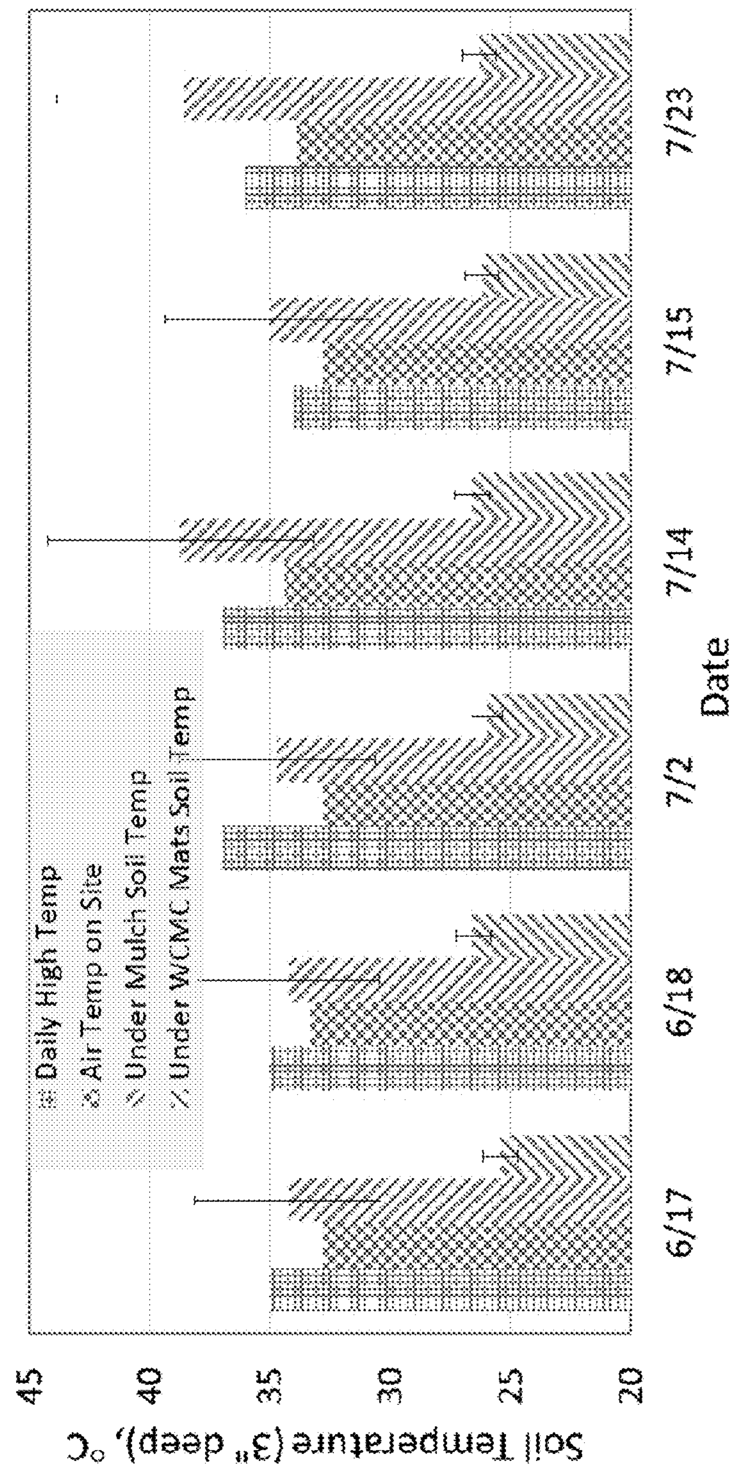
FIG. 12 shows data for soil temperatures (3" below soil surface) in June and July.

In some of the warmer days of winter, the temperature under WCMC mats was lower than the temperature that under watering bags. This indicates that in the very hot summer days, soil temperature under WCMC mats will desirably be lower than that under watering bags to offer hot weather protection for trees. However, complete temperature data could not be collected in the road median because of vandalization of the temperature sensors. Therefore, temperatures were only collected from two parks in a nearby county in the days with high temperature above 90 F (32° C.). Data is shown in FIG. 12. On the hottest days, the soil temperature under the WCMC mat was lower than 27° C. Much higher average temperatures, 34-38° C. (as high as 45° C.), were recorded for trees covered with mulch only. The direct sun exposure does contribute much to the soil temperature.

Soil Moisture Stabilizer Mat for Foundation of Structures on Expansive Soils

One embodiment provides a method of stabilizing soil moisture in expansive or other soil with any WCMC mat or prototype WCMC mat described herein, which includes placing the WCMC mat or prototype WCMC mat on the soil as a soil stabilization mat or foundation mat, and allowing it to remain on the soil for an extended period of time.

Another embodiment provides a method of reducing the occurrence of damage to infrastructure located in or on the ground, which includes placing a soil stabilization mat or foundation mat, such as any WCMC mat or prototype WCMC mat described herein on the soil near, around, or above the infrastructure, and allowing it to remain on the soil for an extended period of time.

One embodiment includes using foundation mat to stabilize the soil moisture for an extended period, even without watering or rainfall. As demonstrated in the field trials for urban forestry applications in Richmond, VA, USA, a moisture conservation mat was used for trees planted in the road medium to maintain a much more stable moisture content for 4 months even without the use of an irrigation watering (FIG. 7).

Another test was performed in a rain exclusion shelter during the summer months. The whole system was connected to the environment with normal sunlight, air flow, outdoor temperature fluctuation, and transpiration from weeds and plants, except that rain falls were sheltered off. Soil moisture levels found to be between 6 and 8 at 4-inch deep in soil for 6 weeks (FIG. 5). For foundations on expansive soils, the foundation mat can greatly reduce irrigation watering need by reducing evaporation, slow release of the water stored in the mat and by capturing rain water that falls onto it.

It can also be combined with an existing irrigation system. In field tests at a nursery farm where drip irrigation and micro-spray irrigation systems are used, the soil moisture was found to be stabilized around 5.6 with only half of water used (FIGS. 8 and 9).

The foundation mat comprises three layers: top layer is a permeable or impermeable plastic film; center layer is a water absorbent material that contains super absorbent polymer; the bottom layer being a permeable layer that allows moisture transmit from the center layer to the soil, vice versa.

The foundation mat with center layer containing absorbent materials recovered from diapers and other incontinence products, such as described in US20140230322.

The foundation mat will greatly reduce water usage with a super uniform soil moisture content, example is the manuscript where soil moisture is much more stable under plant protection mats (WCMC mats) than that under watering bags, The foundation mat with a moisture sensor such as disclosed in, for example, U.S. Pat. No. 6,132,138 attached to the foundation mat so that moisture level is monitored and irrigation is dispensed as needed.

The foundation mat is used in connection with one or plural of porous pipes or soaker hoses similar the system, such as described in U.S. Pat. Nos. 5,156,494 and 4,534,143, or a wicking material like that described in U.S. Pat. No. 7,018,134 on top of or inside of the foundation mat, an irrigation controlling system, such as described in U.S. Pat. No. 6,082,932

Incorporate an automatic irrigation control which is activated by moisture sensor in soil, such as described in U.S. Pat. Nos. 6,132,138, 7,018,134, 6,082,932, US20080219768 or by stress sensor described in U.S. Pat. No. 5,156,494.

The foundation mat can be made with holes for establishment of vegetation, such as described in US Published Application No. 20140230322.

The foundation mat may also be used in combination with foundation stabilization systems such as described in US Published Application No. 20130071186.

A method of using the foundation mat by applying it on top of expansive soils under the foundation of buildings, and other infrastructures.

A method of using the foundation mat by placing it on top of swelling soils and by covering with covered with mulch, gravel, sand bricks, granite, pavement, dirt or the combination of two or more of these materials.

A method of using foundation mat on the perimeters of the foundations of any buildings, bridges, roads and other structures.

The contents of articles, references, patents, and publications described herein are hereby incorporated by reference.

EXAMPLES

Example 1

Fabrication of Tree Protection Mat in Vineyard Application

As illustrated in FIG. 13, a grape vine (for vineyard) protection mat was prepared with 1). a top cover plate: rectangular-shaped woven polypropylene fabric strip of 12 inch wide and 120 ft long; 2) a semipermeable bottom layer: rectangular-shaped spunbond polypropylene nonwoven fabric of the same dimension as the top cover plate; and 3) a center water holding layer using a total of 1200 grams of superabsorbent polymer particles (Crosslinked Potassium Acrylate Acrylamide Copolymer). Using a sewing machine, the top cover plate was sewn to the semipermeable bottom layer along the 2 short edges and 1 long edge of the rectangular shape first. The long strip is then divided into 2 ft long compartments using the sewing machine. For one in every three compartments, 60 grams of SAP is added before complete closure of the compartment along the second long edge with a sewing machine.

Two of this grape protection mats were used for a vineyard where grape vines were planted 6 ft apart and in a 120 ft long row. One mat on each side of the grape vine roll. The first compartment with SAP is place right next to the first grape vine in the row so that the rest of the SAP containing compartments are aligned up with the rest of the grape vines in the same row.

Example 2

Fabrication of Tree Protection Mat for Tree Seedling Protection

As illustrated in FIG. 14, a tree seedling protection mat was prepared with 1). a top cover plate: rectangular-shaped woven polypropylene fabric strip of 8 inch wide and 200 ft long; 2) a semipermeable bottom layer: rectangular-shaped spunbond polypropylene nonwoven fabric of the same dimension as the top cover plate; and 3) a center water holding layer using a total of 2000 grams of superabsorbent polymer particles (Crosslinked Potassium Acrylate Acrylamide Copolymer). Using a sewing machine, the top cover plate was sewn to the semipermeable bottom layer along the 2 short edges and 1 long edge of the rectangular shape first. The long strip is then divided into 1 ft long compartments using the sewing machine. For each compartment, 10 grams of SAP is added before complete closure of the compartment with a sewing machine along the second long edge with two rows of stitches. The two rows of stitches is 2 inch apart along the second long edge to create a row of 2"×12" compartments without SAP.

Two of these tree seedling protection mats were used for a nursery where seeds or seedlings were planted 1 ft apart in a 200 ft long row, one mat on each side of the seedling row with the compartments without SAP overlapping on each other. For each seedling position, a knife or scissor was used to cut a slit open in the overlapped section to allow seedlings go through the overlapped mat.

Example 3

Fabrication of a Foundation Soil Moisture Stabilizer

A foundation soil moisture stabilizer mat was prepared with 1). a top cover plate: rectangular-shaped woven polypropylene fabric of 8"×16"; 2) a semipermeable bottom layer: rectangular-shaped spunbond polypropylene nonwoven fabric; and 3) a center water holding layer using 25 grams of superabsorbent polymer particles (Crosslinked Potassium Acrylate Acrylamide Copolymer). Using a sewing machine, the top cover plate was sewn to the semipermeable bottom layer along the outer perimeter edges thereof, with the superabsorbent polymer particles—as a center layer—placed between the top cover plate and the semipermeable bottom layer.

Figure 15:
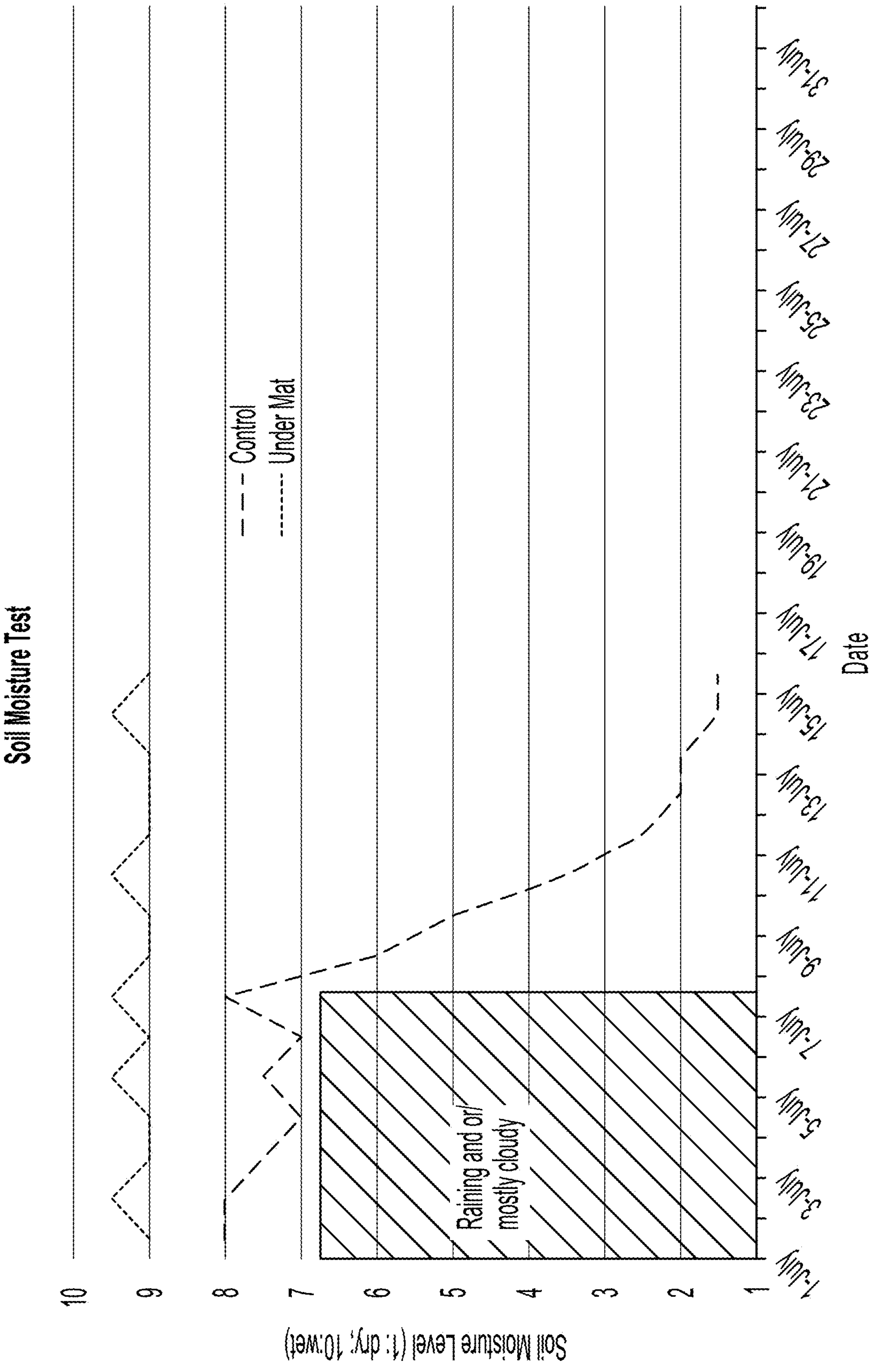
FIG. 15 shows data for Soil Moisture Stabilization Mat Test for one embodiment of the soil moisture stabilization or foundation mat. The experiment was conducted in a rain excluding shelter with full afternoon sunshine on sunny days. Soil moisture level was measured daily in the morning for at least 5 data points and the soil moisture probe was inserted in soil for at least 1 inch when it is permitted. Control: Clay-rich soil in a container without ground coverage (vegetation or mulch); Under Mat: Clay-rich soil in a container covered with a Soil Moisture Stabilization Mat without ground coverage (vegetation or mulch).

The foundation soil moisture stabilizer mat is placed on top of expansive clay soil in a rectangular-shaped container, which has the same dimension as the device. The depth of the clay soil is at least 8 inches. The foundation soil moisture stabilizer and the expansive clay soil is then watered thoroughly. Drain all standing water. Soil moisture of this device is then measured twice a day for comparison of the changes in soil moisture. Chart included (FIG. 15).

Example 4

Fabrication of a Sheet of Foundation Soil Moisture Stabilizer

A foundation soil moisture stabilizer mat was prepared with 1). a top cover plate: rectangular-shaped woven polypropylene fabric of 2 ft wide and 8 ft long; 2) a semipermeable bottom layer: rectangular-shaped spunbond polypropylene nonwoven fabric of the same dimension as the top cover plate; and 3) a center water holding layer using 480 grams of superabsorbent polymer particles (Crosslinked Potassium Acrylate Acrylamide Copolymer,). Using a sewing machine, the top cover plate was sewn to the semipermeable bottom layer along the along the outer perimeter edges thereof, with the superabsorbent polymer particles—as a center layer—placed between the top cover plate and the semipermeable bottom layer. The 2 ft by 8 ft device was divided by using the sewing machine into four 2'×2' compartments, for which each has one fourth of the total 480 grams of SAP. The soil moisture stabilizer was placed beside the foundation of house right next to the foundation.

Example 5

Fabrication of a Foundation Soil Moisture Stabilizer Using Recycled Diaper SAP Materials A device similar to Example 2 was prepared by replacing half of the SAP (240 grams) with 1000 grams of recycled diaper SAP materials. Each SAP and recycled diaper SAP materials were divided into 4 parts and placed in each of the four compartments.

The entire contents of each patent and publication cited herein are incorporated herein by reference.

The invention claimed is:

1. A method of stabilizing soil moisture in expansive or other soil, comprising placing a soil moisture stabilization mat on the soil, wherein the soil moisture stabilization mat comprises:

a top layer, having a first perimeter edge;

a water-permeable bottom layer, having a second perimeter edge affixed either directly to the first perimeter edge, or indirectly to the first perimeter edge via an intervening sidewall to define a compartment with multiple sections; and wherein one or more sections include a water-absorbing and releasing center layer disposed between the top and bottom layers, and comprising superabsorbent particles and wherein one or more sections does not include superabsorbent particles.

2. The method of claim 1, wherein the expansive or other soil includes an infrastructure comprising one or more of a foundation, building, dwelling, house, road, roadbed, street, highway, pavement, sidewalk, railway, subway, runway, bridge, dam, pier, utility, utility pole, utility tunnel, tunnel, pipeline, buried conduit, tower, airport, sewage line, gas line, water pipe, storage tank, or a combination of two or more thereof.

3. The method of claim 1, further comprising watering the soil moisture stabilization mat.

4. The method of claim 1, wherein the superabsorbent particles are embedded in a matrix in the water-absorbing and releasing center layer.

5. The method of claim 1, wherein the multiple sections are separated by stitching lines, heat sealing lines, adhesive lines, or a combination of two or more thereof.

6. The method of claim 1, wherein the one or more sections having superabsorbent particles and the one or more section not having superabsorbent particles alternate.

7. The method of claim 1, wherein the top layer reduces or prevents evaporative water loss from the center layer.

8. The method of claim 1, wherein the top layer further comprises one or more perforations, funnel, hole, opening, channel, seam, or a combination of two or more thereof, to permit one or more of atmospheric water, dew, rainwater, applied water, or a combination of two or more thereof to penetrate into the center layer.

9. The method of claim 1, wherein the top layer is made of fabric, woven material, non-woven material, film, plastic, laminate, sheeting, polymer, or a combination of two or more thereof.

10. The method of claim 1, wherein the superabsorbent particles comprise polyacrylic acid polymer, polyacrylate polymer, starch-grafted polymer, polyacrylamide, ethylene maleic anhydride polymer, carboxymethylcellulose, polyvinyl alcohol, polyethylene oxide, starch grafted copolymer of polyacrylonitrile, Group IA salt of polyacrylic acid, copolymer of two or more thereof, bio-based super absorbent polymer, starch-based super absorbent polymer, cellulose-based super absorbent polymer, biodegradable superabsorbent polymer, superabsorbent cellulosic hydrogel, or any combination thereof.

11. The method of claim 1, wherein the first and second perimeter edges are affixed via sewing, heat-sealing, friction-welding, laser-welding, ultrasonic-welding, induction-welding, radio-frequency-welding, heat-bonding, adhesive, solvent-welding, stapling, or a combination of two or more thereof.

* * * * *